(12) United States Patent
Khoshnevisan et al.

(10) Patent No.: US 12,047,971 B2
(45) Date of Patent: Jul. 23, 2024

(54) QUASI CO-LOCATION RELATED PRIORITY RULES FOR MULTI-DOWNLINK CONTROL INFORMATION BASED MULTI-TRANSMISSION/RECEPTION POINT

(71) Applicant: QUALCOMM Incorporated, San Diego, CA (US)

(72) Inventors: Mostafa Khoshnevisan, San Diego, CA (US); Alexandros Manolakos, Escondido, CA (US); Xiaoxia Zhang, San Diego, CA (US); Tao Luo, San Diego, CA (US); Jing Sun, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/158,506

(22) Filed: Jan. 24, 2023

(65) Prior Publication Data

US 2023/0164800 A1 May 25, 2023

Related U.S. Application Data

(63) Continuation of application No. 16/911,953, filed on Jun. 25, 2020, now Pat. No. 11,678,337.

(30) Foreign Application Priority Data

Jul. 18, 2019 (GR) .............................. 20190100308

(51) Int. Cl.
*H04W 72/23* (2023.01)
*H04W 72/1268* (2023.01)
*H04W 72/1273* (2023.01)

(52) U.S. Cl.
CPC ....... *H04W 72/23* (2023.01); *H04W 72/1268* (2013.01); *H04W 72/1273* (2013.01)

(58) Field of Classification Search
None
See application file for complete search history.

(56) References Cited

U.S. PATENT DOCUMENTS

2019/0074880 A1* 3/2019 Frenne ................. H04B 7/0617
2019/0081763 A1 3/2019 Akkarakaran et al.
(Continued)

FOREIGN PATENT DOCUMENTS

WO 2019099393 A1 5/2019

OTHER PUBLICATIONS

Huawei., et al., "Enhancements on Multi-TRP/Panel Transmission", 3GPP Draft, 3GPP TSG RAN WG1 Ad-Hoc Meeting 1901, R1-1900017, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019 Jan. 20, 2019 (Jan. 20, 2019), XP051592944, 15 Pages, section 2.
(Continued)

*Primary Examiner* — Phirin Sam
(74) *Attorney, Agent, or Firm* — Harrity & Harrity, LLP

(57) ABSTRACT

Various aspects of the present disclosure generally relate to wireless communication. In some aspects, a user equipment (UE) may receive, on a particular control resource set (CORESET), downlink control information (DCI) scheduling a physical downlink shared channel (PDSCH) or a physical uplink shared channel (PUSCH). The UE may be configured with multi-DCI based multi-transmission/reception point (TRP) operation. The UE may determine, based at least in part on the UE being configured with multi-DCI based multi-TRP operation, a fixed higher layer index that
(Continued)

identifies a CORESET group with which the particular CORESET is associated. The UE may perform an operation, associated with receiving the PDSCH or transmitting the PUSCH, based at least in part on the fixed higher layer index identifying the CORESET group with which the particular CORESET is associated. Numerous other aspects are provided.

30 Claims, 15 Drawing Sheets

(56) References Cited

U.S. PATENT DOCUMENTS

| | | | |
|---|---|---|---|
| 2019/0110290 A1 | 4/2019 | Sun et al. | |
| 2020/0145982 A1* | 5/2020 | Cheng | H04W 72/044 |
| 2020/0154402 A1* | 5/2020 | Lee | H04W 56/001 |
| 2020/0221427 A1* | 7/2020 | Nilsson | H04W 36/0027 |
| 2020/0314881 A1* | 10/2020 | Bagheri | H04L 5/10 |
| 2020/0351892 A1* | 11/2020 | Yi | H04L 5/0092 |
| 2020/0351925 A1* | 11/2020 | Bagheri | H04W 72/23 |
| 2020/0351926 A1* | 11/2020 | Bagheri | H04W 72/23 |
| 2020/0404690 A1 | 12/2020 | Lee et al. | |
| 2021/0022167 A1 | 1/2021 | Khoshnevisan | |
| 2021/0050936 A1* | 2/2021 | Seo | H04L 5/0053 |
| 2021/0136806 A1 | 5/2021 | Xiong et al. | |
| 2021/0321442 A1 | 10/2021 | Jung et al. | |
| 2022/0022065 A1 | 1/2022 | Wang et al. | |
| 2022/0116247 A1 | 4/2022 | Sengupta et al. | |
| 2022/0131642 A1 | 4/2022 | Kim et al. | |
| 2022/0159641 A1* | 5/2022 | Kim | H04W 72/20 |
| 2022/0167321 A1 | 5/2022 | Zhang et al. | |
| 2022/0256573 A1* | 8/2022 | Frenne | H04L 5/0053 |
| 2022/0312452 A1* | 9/2022 | Frenne | H04W 72/1273 |
| 2022/0338222 A1 | 10/2022 | Kim et al. | |
| 2022/0338227 A1* | 10/2022 | Cirik | H04W 72/53 |
| 2022/0386332 A1* | 12/2022 | Yokomakura | H04W 72/23 |
| 2023/0125598 A1* | 4/2023 | Sun | H04W 72/12 370/329 |
| 2023/0132212 A1* | 4/2023 | Gao | H04L 1/1812 370/329 |
| 2023/0155659 A1* | 5/2023 | Ganesan | H04W 24/02 370/329 |
| 2023/0155785 A1* | 5/2023 | Yu | H04L 5/0051 370/329 |
| 2023/0164797 A1* | 5/2023 | Cirik | H04W 72/0446 370/329 |

OTHER PUBLICATIONS

International Preliminary Report on Patentability—PCT/US2020/039834, The International Bureau of WIPO—Geneva, Switzerland, Jan. 27, 2022.
International Search Report and Written Opinion—PCT/US2020/039834—ISA/EPO—Oct. 6, 2020.
OPPO: "Enhancements on Multi-TRP and Multi-Panel Transmission", 3GPP Draft, 3GPP TSG RAN WG1 Meeting #97, R1-1906287, 3rd Generation Partnership Project (3GPP), Mobile Competence Centre, 650, Route Des Lucioles, F-06921 Sophia-Antipolis Cedex, France, vol. Ran WG1, No. RENO, USA, May 13, 2019-May 17, 2019 May 13, 2019 (May 13, 2019), XP051727739, 11 Pages, section 2.1.
Partial International Search Report—PCT/US2020/039834—ISA/EPO—Sep. 14, 2020.
ZTE: "Considerations on Beam Management for Multi-TRP," 3GPP Draft, 3GPP TSG RAN WG1 #97, R1-1906244, Considerations on beam management for multi-TRP, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727697, pp. 1-7, sections 2.1, 2.1.2, 2.2.2.

* cited by examiner

QUASI CO-LOCATION RELATED PRIORITY RULES FOR MULTI-DOWNLINK CONTROL INFORMATION BASED MULTI-TRANSMISSION/RECEPTION POINT

CROSS-REFERENCE TO RELATED APPLICATION

This application is a continuation of U.S. patent application Ser. No. 16/911,953, filed Jun. 25, 2020, entitled "QUASI CO-LOCATION RELATED PRIORITY RULES FOR MULTI-DOWNLINK CONTROL INFORMATION BASED MULTI-TRANSMISSION/RECEPTION POINT," which claims priority to Greece Patent Application No. 20190100308, filed on Jul. 18, 2019, entitled "QUASI CO-LOCATION RELATED PRIORITY RULES FOR MULTI-DOWNLINK CONTROL INFORMATION BASED MULTI-TRANSMISSION/RECEPTION POINT," and assigned to the assignee hereof. The disclosure of the prior Application is considered part of and is incorporated by reference into this patent application.

FIELD OF THE DISCLOSURE

Aspects of the present disclosure generally relate to wireless communication and to techniques and apparatuses for quasi co-location (QCL) related priority rules for multi-downlink control information (DCI) based multi-transmission/reception (TRP) operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, on a particular control resource set (CORESET), downlink control information (DCI) scheduling a physical downlink shared channel (PDSCH) or a physical uplink shared channel (PUSCH), wherein the UE is configured with multiple DCI (multi-DCI) based multiple transmission/reception point (multi-TRP) operation; determining, based at least in part on the UE being configured with multi-DCI based multi-TRP operation, a fixed higher layer index that identifies a CORESET group with which the particular CORESET is associated; and performing an operation, associated with receiving the PDSCH or transmitting the PUSCH, based at least in part on the fixed higher layer index identifying the CORESET group with which the particular CORESET is associated.

In some aspects, a method of wireless communication, performed by a UE, may include determining that the UE is to monitor physical downlink control channel (PDCCH) candidates in overlapping PDCCH monitoring occasions in multiple CORESETs having different quasi co-location (QCL) type properties on active downlink bandwidth parts of one or more cells, wherein the UE is configured with multi-DCI based multi-TRP operation; determining a set of prioritized CORESETs, each of the set of prioritized CORESETs being included in a respective CORESET group of a set of CORESET groups, wherein, for each CORESET group, a respective prioritized CORESET is determined based at least in part on a priority rule, and wherein the set of CORESET groups include the multiple CORESETs; and monitoring one or more PDCCH candidates in the determined set of prioritized CORESETs.

In some aspects, a method of wireless communication, performed by a UE, may include receiving DCI including an indication to receive a PDSCH, wherein the DCI is received on a first CORESET, and wherein the UE is configured with multi-DCI based multi-TRP operation; determining that the PDSCH overlaps with a PDCCH to be received by the UE on a second CORESET; determining that the first CORESET and the second CORESET are in a same CORESET group; and selectively prioritizing reception of the PDSCH or the PDCCH based at least in part on a priority rule and based at least in part on the first CORESET and the second CORESET being in the same CORESET group.

In some aspects, a method of wireless communication, performed by a UE, may include determining that a first PDSCH to be received on a first cell, associated with a frequency band, overlaps with a second PDSCH to be received on a second cell associated with the frequency band; wherein the first PDSCH is associated with first DCI received on a first CORESET and the second PDSCH is associated with second DCI received on a second CORESET, and wherein the UE is configured with multi-DCI based multi-TRP operation; determining that the first CORESET and the second CORESET are included in a same CORESET group; and prioritizing reception of the first PDSCH or the second PDSCH based at least in part on a priority rule and based at least in part on determining that the first CORESET and the second CORESET are included in the same CORESET group.

In some aspects, a method of wireless communication, performed by a UE, may include receiving DCI on a CORESET, the DCI scheduling a PDSCH, wherein the UE is configured with multi-DCI based multi-transmission/reception point (TRP) operation; and identifying, based at least in part on receiving the DCI on the CORESET and based at least in part on the UE being configured with multi-DCI based multi-TRP operation, a particular CORESET having: a lowest CORESET identifier associated with a monitored search space among a set of CORESETs in a latest slot monitored by the UE, and a same higher layer index as the CORESET on which the DCI was received; and determining a QCL for the PDSCH based at least in part on a QCL of the particular CORESET.

In some aspects, a UE for wireless communication may include memory and one or more processors operatively coupled to the memory. The memory and the one or more processors may be configured to receive, on a particular CORESET, DCI scheduling a PDSCH or a PUSCH, wherein the UE is configured with multi-DCI based multi-TRP operation; determine, based at least in part on the UE being configured with multi-DCI based multi-TRP operation, a fixed higher layer index that identifies a CORESET group with which the particular CORESET is associated; and perform an operation, associated with receiving the PDSCH or transmitting the PUSCH, based at least in part on the fixed higher layer index identifying the CORESET group with which the particular CORESET is associated.

In some aspects, a UE for wireless communication may include memory and one or more processors operatively coupled to the memory. The memory and the one or more processors may be configured to receive DCI on a CORESET, the DCI scheduling a PDSCH, wherein the UE is configured with multi-DCI based multi-TRP operation; identify, based at least in part on receiving the DCI on the CORESET and based at least in part on the UE being configured with multi-DCI based multi-TRP operation, a particular CORESET having: a lowest CORESET identifier associated with a monitored search space among a set of CORESETs in a latest slot monitored by the UE, and a same higher layer index as the CORESET on which the DCI was received; and determine a QCL for the PDSCH based at least in part on a QCL of the particular CORESET.

In some aspects, a UE for wireless communication may include memory and one or more processors operatively coupled to the memory. The memory and the one or more processors may be configured to determine that the UE is to monitor PDCCH candidates in overlapping PDCCH monitoring occasions in multiple CORESETs having different QCL type properties on active downlink bandwidth parts of one or more cells, wherein the UE is configured with multi-DCI based multi-TRP operation; determine a set of prioritized CORESETs, each of the set of prioritized CORESETs being included in a respective CORESET group of a set of CORESET groups, wherein, for each CORESET group, a respective prioritized CORESET is determined based at least in part on a priority rule, and wherein the set of CORESET groups include the multiple CORESETs; and monitor one or more PDCCH candidates in the determined set of prioritized CORESETs.

In some aspects, a UE for wireless communication may include memory and one or more processors operatively coupled to the memory. The memory and the one or more processors may be configured to receive DCI including an indication to receive a PDSCH, wherein the DCI is received on a first CORESET, and wherein the UE is configured with multi-DCI based multi-TRP operation; determine that the PDSCH overlaps with a PDCCH to be received by the UE on a second CORESET; determine that the first CORESET and the second CORESET are in a same CORESET group; and selectively prioritize reception of the PDSCH or the PDCCH based at least in part on a priority rule and based at least in part on the first CORESET and the second CORESET being in the same CORESET group.

In some aspects, a UE for wireless communication may include memory and one or more processors operatively coupled to the memory. The memory and the one or more processors may be configured to determine that a first PDSCH to be received on a first cell, associated with a frequency band, overlaps with a second PDSCH to be received on a second cell associated with the frequency band; wherein the first PDSCH is associated with first DCI received on a first CORESET and the second PDSCH is associated with second DCI received on a second CORESET, and wherein the UE is configured with multi-DCI based multi-transmission/reception point (TRP) operation; determine that the first CORESET and the second CORESET are included in a same CORESET group; and prioritize reception of the first PDSCH or the second PDSCH based at least in part on a priority rule and based at least in part on determining that the first CORESET and the second CORESET are included in the same CORESET group.

In some aspects, a non-transitory computer-readable medium may store one or more instructions for wireless communication. The one or more instructions, when executed by one or more processors of a UE, may cause the one or more processors to: receive, on a particular CORESET, DCI scheduling a PDSCH or a PUSCH, wherein the UE is configured with multi-DCI based multi-TRP operation; determine, based at least in part on the UE being configured with multi-DCI based multi-TRP operation, a fixed higher layer index that identifies a CORESET group with which the particular CORESET is associated; and perform an operation, associated with receiving the PDSCH or transmitting the PUSCH, based at least in part on the fixed higher layer index identifying the CORESET group with which the particular CORESET is associated.

In some aspects, a non-transitory computer-readable medium may store one or more instructions for wireless communication. The one or more instructions, when executed by one or more processors of a UE, may cause the one or more processors to: receive DCI on a CORESET, the DCI scheduling a PDSCH, wherein the UE is configured with multi-DCI based multi-TRP operation; identify, based at least in part on receiving the DCI on the CORESET and based at least in part on the UE being configured with multi-DCI based multi-TRP operation, a particular CORESET having: a lowest CORESET identifier associated with a monitored search space among a set of CORESETs in a latest slot monitored by the UE, and a same higher layer index as the CORESET on which the DCI was received; and determine a QCL for the PDSCH based at least in part on a QCL of the particular CORESET.

In some aspects, a non-transitory computer-readable medium may store one or more instructions for wireless communication. The one or more instructions, when executed by one or more processors of a UE, may cause the one or more processors to: determine that the UE is to monitor PDCCH candidates in overlapping PDCCH monitoring occasions in multiple CORESETs having different QCL type properties on active downlink bandwidth parts of one or more cells, wherein the UE is configured with multi-DCI based multi-TRP operation; determine a set of prioritized CORESETs, each of the set of prioritized CORESETs being included in a respective CORESET group of a set of CORESET groups, wherein, for each CORESET group, a respective prioritized CORESET is determined based at least in part on a priority rule, and wherein the set of CORESET groups include the multiple CORESETs; and monitor one or more PDCCH candidates in the determined set of prioritized CORESETs.

In some aspects, a non-transitory computer-readable medium may store one or more instructions for wireless communication. The one or more instructions, when executed by one or more processors of a UE, may cause the one or more processors to: receive DCI including an indication to receive a PDSCH, wherein the DCI is received on a first CORESET, and wherein the UE is configured with multi-DCI based multi-TRP operation; determine that the PDSCH overlaps with a PDCCH to be received by the UE on a second CORESET; determine that the first CORESET and the second CORESET are in a same CORESET group; and selectively prioritize reception of the PDSCH or the PDCCH based at least in part on a priority rule and based at least in part on the first CORESET and the second CORESET being in the same CORESET group.

In some aspects, a non-transitory computer-readable medium may store one or more instructions for wireless communication. The one or more instructions, when executed by one or more processors of a UE, may cause the one or more processors to: determine that a first PDSCH to be received on a first cell, associated with a frequency band, overlaps with a second PDSCH to be received on a second cell associated with the frequency band; wherein the first PDSCH is associated with first DCI received on a first CORESET and the second PDSCH is associated with second DCI received on a second CORESET, and wherein the UE is configured with multi-DCI based multi-TRP operation; determine that the first CORESET and the second CORESET are included in a same CORESET group; and prioritize reception of the first PDSCH or the second PDSCH based at least in part on a priority rule and based at least in part on determining that the first CORESET and the second CORESET are included in the same CORESET group.

In some aspects, an apparatus for wireless communication may include means for receiving, on a particular CORESET, DCI scheduling a PDSCH or a PUSCH, wherein the apparatus is configured with multi-DCI based multi-TRP operation; means for determining, based at least in part on the apparatus being configured with multi-DCI based multi-TRP operation, a fixed higher layer index that identifies a CORESET group with which the particular CORESET is associated; and means for performing an operation, associated with receiving the PDSCH or transmitting the PUSCH, based at least in part on the fixed higher layer index identifying the CORESET group with which the particular CORESET is associated.

In some aspects, an apparatus for wireless communication may include means for receiving DCI on a CORESET, the DCI scheduling a PDSCH, wherein the apparatus is configured with multi-DCI based multi-TRP operation; means for identifying, based at least in part on receiving the DCI on the CORESET and based at least in part on the apparatus being configured with multi-DCI based multi-TRP operation, a particular CORESET having: a lowest CORESET identifier associated with a monitored search space among a set of CORESETs in a latest slot monitored by the apparatus, and a same higher layer index as the CORESET on which the DCI was received; and means for determining a QCL for the PDSCH based at least in part on a QCL of the particular CORESET.

In some aspects, an apparatus for wireless communication may include means for determining that the apparatus is to monitor PDCCH candidates in overlapping PDCCH monitoring occasions in multiple CORESETs having different QCL type properties on active downlink bandwidth parts of one or more cells, wherein the apparatus is configured with multi-DCI based multi-TRP operation; means for determining a set of prioritized CORESETs, each of the set of prioritized CORESETs being included in a respective CORESET group of a set of CORESET groups, wherein, for each CORESET group, a respective prioritized CORESET is determined based at least in part on a priority rule, and wherein the set of CORESET groups include the multiple CORESETs; and means for monitoring one or more PDCCH candidates in the determined set of prioritized CORESETs.

In some aspects, an apparatus for wireless communication may include means for receiving DCI including an indication to receive a PDSCH, wherein the DCI is received on a first CORESET, and wherein the apparatus is configured with multi-DCI based multi-TRP operation; means for determining that the PDSCH overlaps with a PDCCH to be received by the apparatus on a second CORESET; means for determining that the first CORESET and the second CORESET are in a same CORESET group; and means for selectively prioritizing reception of the PDSCH or the PDCCH based at least in part on a priority rule and based at least in part on the first CORESET and the second CORESET being in the same CORESET group.

In some aspects, an apparatus for wireless communication may include means for determining that a first PDSCH to be received on a first cell, associated with a frequency band, overlaps with a second PDSCH to be received on a second cell associated with the frequency band; wherein the first PDSCH is associated with first DCI received on a first CORESET and the second PDSCH is associated with second DCI received on a second CORESET, and wherein the apparatus is configured with multi-DCI based multi-TRP operation; means for determining that the first CORESET and the second CORESET are included in a same CORESET group; and means for prioritizing reception of the first PDSCH or the second PDSCH based at least in part on a priority rule and based at least in part on determining that the first CORESET and the second CORESET are included in the same CORESET group.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
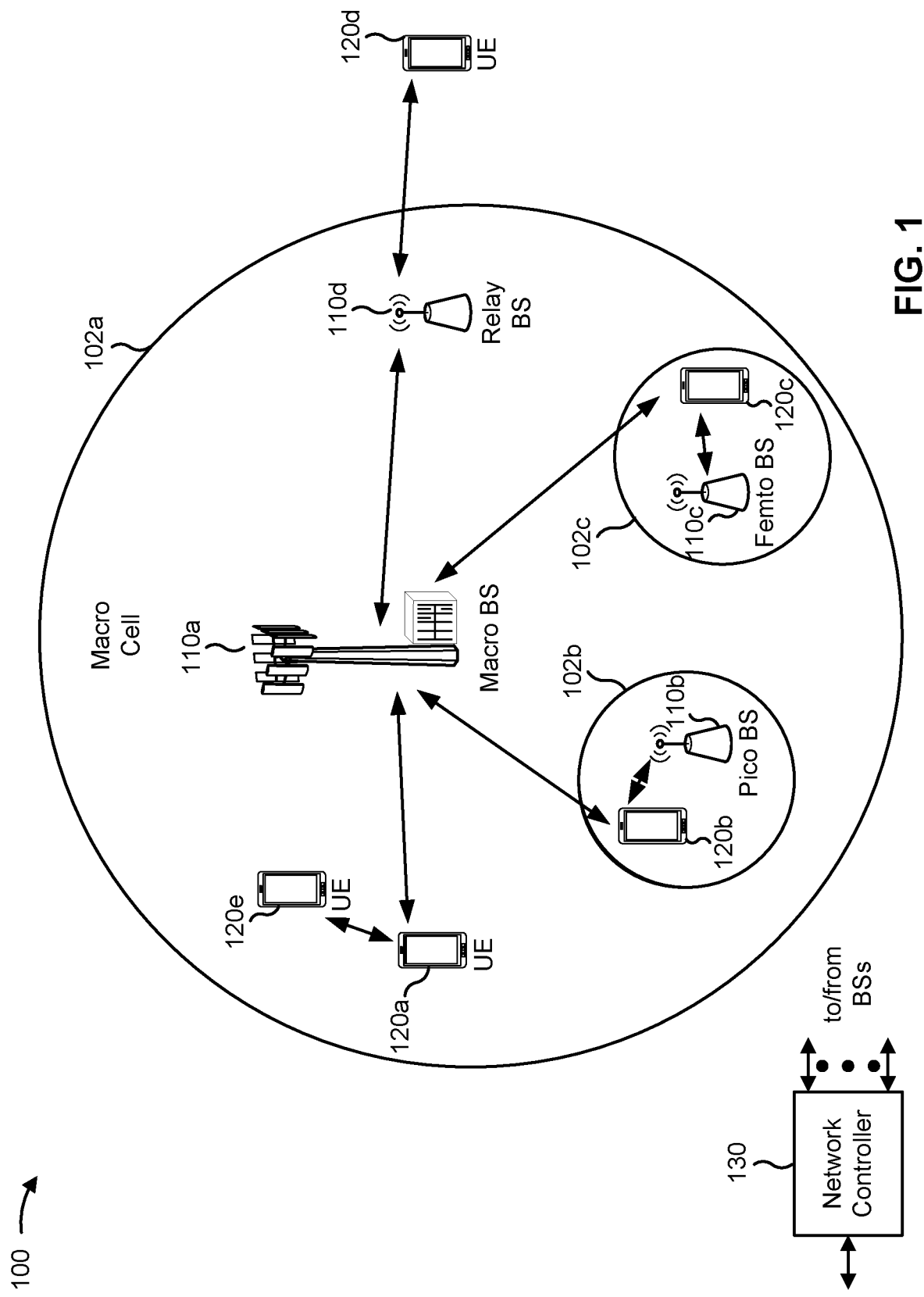
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
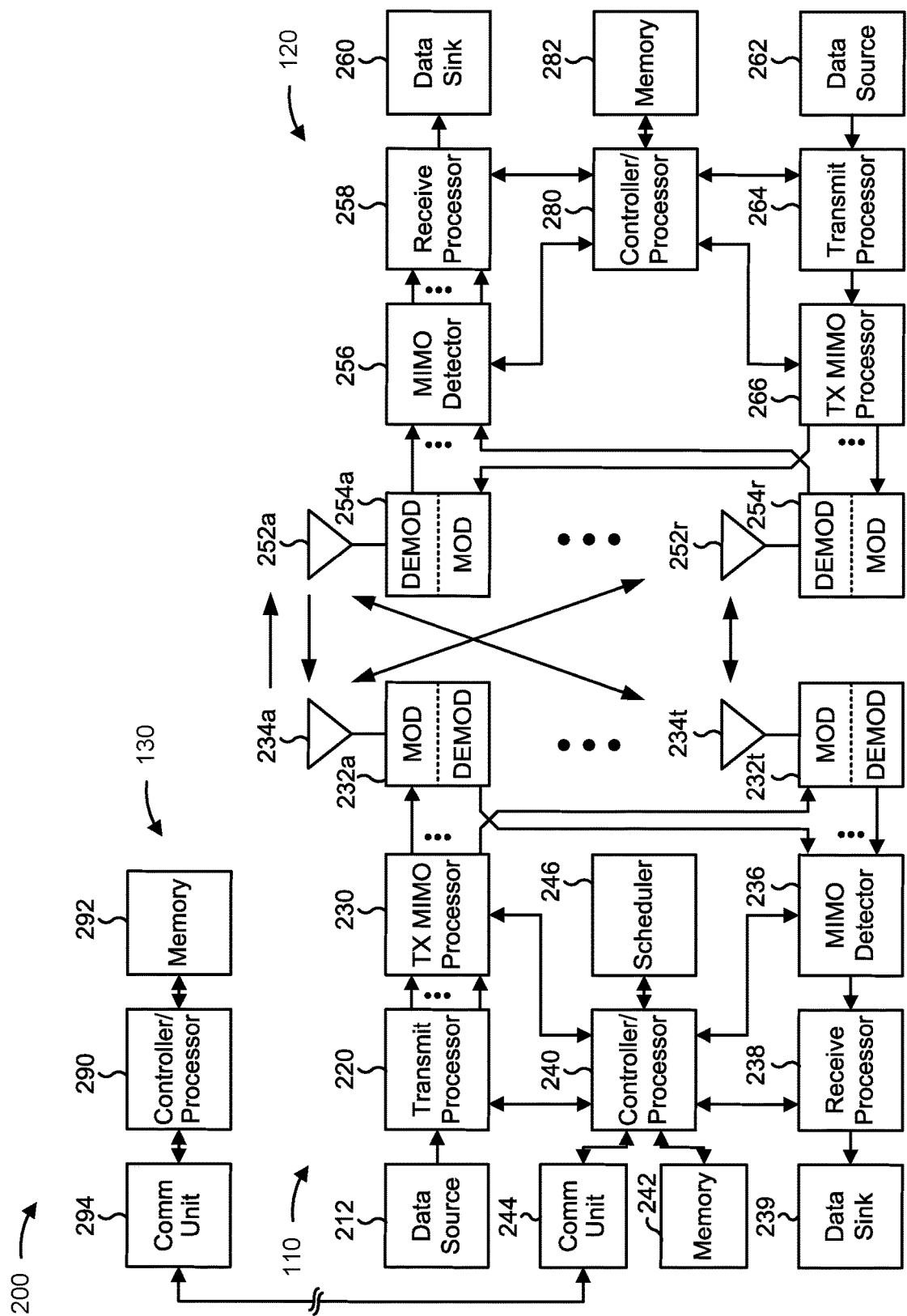
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with QCL related priority rules for multi-DCI based multi-TRP operation, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, process 600 of FIG. 6, process 700 of FIG. 7, process 800 of FIG. 8, and/or other processes as described herein. A scheduler 246 may schedule UEs for data transmission on the downlink and/or uplink.

In some aspects, UE 120 may include means for receiving, on a particular control resource set (CORESET), downlink control information (DCI) scheduling a physical downlink shared channel (PDSCH) or a physical uplink shared channel (PUSCH), wherein UE 120 is configured with multiple DCI (multi-DCI) based multiple transmission/reception point (multi-TRP) operation; means for determining, based at least in part on UE 120 being configured with multi-DCI based multi-TRP operation, a fixed higher layer index that identifies a CORESET group with which the particular CORESET is associated; means for performing an operation, associated with receiving the PDSCH or transmitting the PUSCH, based at least in part on the fixed higher layer index identifying the CORESET group with which the particular CORESET is associated; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving DCI on a CORESET, the DCI scheduling a PDSCH, wherein UE 120 is configured with multi-DCI based multi-TRP operation; means for identifying, based at least in part on receiving the DCI on the CORESET and based at least in part on the UE being configured with multi-DCI based multi-TRP operation, a particular CORESET having: a lowest CORESET identifier associated with a monitored search space among a set of CORESETs in a latest slot monitored by UE 120, and a same higher layer index as the CORESET on which the DCI was received; means for determining a quasi co-location (QCL) for the PDSCH based at least in part on a QCL of the particular CORESET; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining that the UE is to monitor physical downlink control channel (PDCCH) candidates in overlapping PDCCH monitoring occasions in multiple CORESETs having different QCL type properties on active downlink bandwidth parts of one or more cells, wherein UE 120 is configured with multi-DCI based multi-TRP operation; means for determining a set of prioritized CORESETs, each of the set of prioritized CORESETs being included in a respective CORESET group of a set of CORESET groups, wherein, for each CORESET group, a respective prioritized CORESET is determined based at least in part on a priority rule, and wherein the set of CORESET groups include the multiple CORESETs; means for monitoring one or more PDCCH candidates in the determined set of prioritized CORESETs; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving DCI including an indication to receive a PDSCH, wherein the DCI is received on a first CORESET, and wherein UE 120 is configured with multi-DCI based multi-TRP operation; means for determining that the PDSCH overlaps with a PDCCH to be received by the UE on a second CORESET; means for determining that the first CORESET and the second CORESET are in a same CORESET group; means for selectively prioritizing reception of the PDSCH or the PDCCH based at least in part on a priority rule and based at least in part on the first CORESET and the second CORESET being in the same CORESET group; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining that a first PDSCH to be received on a first cell, associated with a frequency band, overlaps with a second PDSCH to be received on a second cell associated with the frequency band, wherein the first PDSCH is associated with first DCI received on a first CORESET and the second PDSCH is associated with second DCI received on a second CORESET, and wherein UE 120 is configured with multi-DCI based multi-TRP operation; means for determining that the first CORESET and the second CORESET are included in a same CORESET group; means for prioritizing reception of the first PDSCH or the second PDSCH based at least in part on a priority rule and based at least in part on determining that the first CORESET and the second CORESET are included in the same CORESET group; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some wireless communications systems, such as an NR system, a UE may be configured with multi-DCI based multi-TRP operation. Multi-DCI based multi-TRP operation configuration allows the UE to concurrently communicate via multiple TRPs. For example, a UE may receive, from a first TRP, first DCI in a first PDCCH, where the first DCI schedules a first PDSCH to be transmitted by the first TRP. Similarly, the UE may receive, from a second TRP, second DCI in a second PDCCH, where the second DCI schedules a second PDSCH to be transmitted by the second TRP. Notably, the first and second PDSCHs can be non-overlapping, partially overlapping, or fully overlapping. In the case of a partial overlapping or a full overlapping, demodulation reference signal (DMRS) symbols can be aligned and different code division multiplexing (CDM) groups can be used in association with communication of the first and second PDSCHs. In association with monitoring DCIs transmitted from different TRPs, the UE may monitor PDCCH candidates in PDCCH monitoring occasions in different CORESETs, as configured by the network.

In the case of multi-DCI based multi-TRP operation described above, differentiation of TRPs at the UE-side is on the basis of CORESET groups. For example, each CORESET may be associated with a higher layer (e.g., a radio resource control (RRC) layer) index, meaning that CORESETs can be grouped based on higher layer indices signaled on a per CORESET basis. These higher layer indices may be used to group CORESETs into multiple groups. For example, CORESETs with a higher layer index of 0 are included in first CORESET group, and CORESETs with a higher layer index of 1 are included in a second CORESET group. Here, the first CORESET group and the second CORESET group each correspond to a different TRP (i.e., CORESETs in a given group are associated with a particular TRP). However, there exists a number of scenarios in which operation of a UE configured with multi-DCI based multi-TRP operation needs to be defined.

One such scenario is associated with a CORESET used for a special purpose, such as CORESET 0 which is typically used for monitoring system information (e.g., system information block 1 (SIB1)). Unlike other CORESETs, CORESET 0 cannot be configured by a CORESET information element (IE). Rather, CORESET 0 is configured in a physical broadcast channel (PBCH) (e.g., via a master information block (MIB)) or a PDCCH common configuration. Such configurations for CORESET 0 may only include a value (e.g., value from range of 0, 1, . . . 15) from which some parameters for CORESET 0 are determined based on a look up table fixed in the specifications. As such, for CORESET 0, unlike other CORESETs, there may not be an easy way to add additional information elements in the configuration that can associate the CORESET with a CORESET group. In the case of multi-DCI based multi-TRP operation, a rule for identifying a CORESET group that includes CORESET 0 needs to be defined in order to indicate a manner in which the UE is to perform an operation associated with receiving a PDSCH or transmitting a PUSCH scheduled by CORESET 0. Some aspects described herein provide techniques and apparatuses for determining, based at least in part on a UE being configured with multi-DCI based multi-TRP operation, a fixed higher layer index that identifies a CORESET group with which a particular CORESET (e.g., CORESET 0) is associated.

Another such scenario is associated with determining a quasi co-location (QCL) for a PDSCH when there is not enough time between a DCI scheduling the PDSCH and the PDSCH when at least one configured transmission configuration indicator (TCI) state for a serving cell of the PDSCH includes a particular QCL type (e.g., QCL Type D). Here, in the case of multi-DCI based multi-TRP operation, a rule for identifying a CORESET from which a QCL assumption can be made is needed. Some aspects described herein provide techniques and apparatuses for identifying, based at least in part on receiving DCI on a CORESET and based at least in part on a UE being configured with multi-DCI based multi-TRP operation, a particular CORESET, and determining a QCL for the PDSCH based at least in part on a QCL of the particular CORESET.

Another such scenario is associated with prioritizing reception of transmissions (e.g., PDCCHs and/or PDSCHs) when the transmissions overlap in at least one symbol when the UE is configured with multi-DCI based multi-TRP. Some aspects described herein provide techniques and apparatuses for selectively prioritizing reception of a given transmission (e.g., a first PDCCH or a first PDSCH) over another transmission (e.g., a second PDCCH or a second PDSCH) based at least in part on a priority rule and based at least in part on identifying CORESET groups associated with the transmissions.

FIGS. 3A-3F are diagrams illustrating examples associated with QCL related priority rules for multi-DCI based multi-TRP operation, in accordance with various aspects of the present disclosure.

Figure 3A:
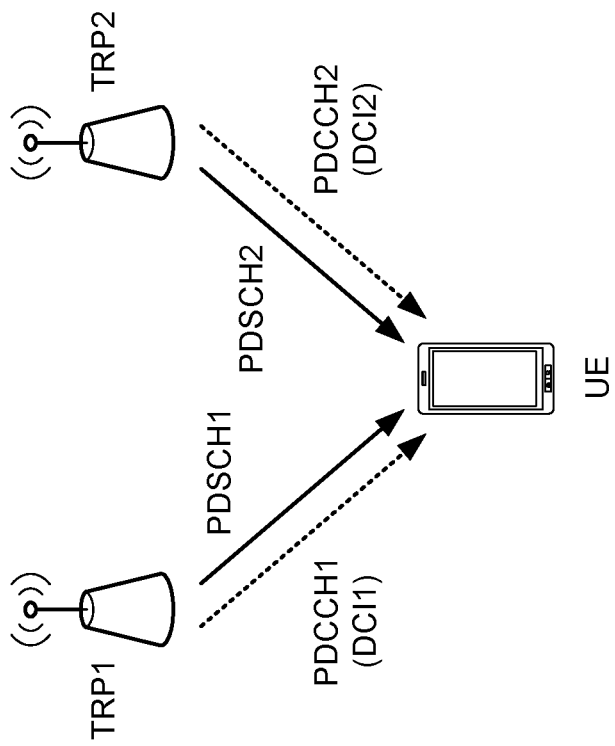
FIGS. 3A-3F are diagrams illustrating examples associated with QCL related priority rules for multi-DCI based multi-TRP operation, in accordance with various aspects of the present disclosure.

FIG. 3A illustrates an example of a UE (e.g., UE 120) that is configured with multi-DCI based multi-TRP operation. As shown in FIG. 3A, when configured with multi-DCI based multi-TRP operation, the UE can receive, from TRP1 (e.g., a base station 110), DCI1 in PDCCH1, where DCI1 schedules PDSCH1 to be transmitted by TRP1. Similarly, the UE can receive, from TRP2 (e.g., a base station 110), DCI2 in a PDCCH2, where DCI2 schedules PDSCH2 to be transmitted by TRP2. In association with monitoring DCIs transmitted from TRP1 and TRP2, the UE may monitor PDCCH candidates in PDCCH monitoring occasions in different CORESETs, as configured by the network. The examples shown in FIGS. 3B-3F can be applied in the framework of operations described by FIG. 3A.

As indicated above, one scenario in which operation of a UE configured with multi-DCI based multi-TRP operation needs to be defined is associated with a particular CORESET, such as a CORESET used for a special purpose (e.g., CORESET 0).

Figure 3B:
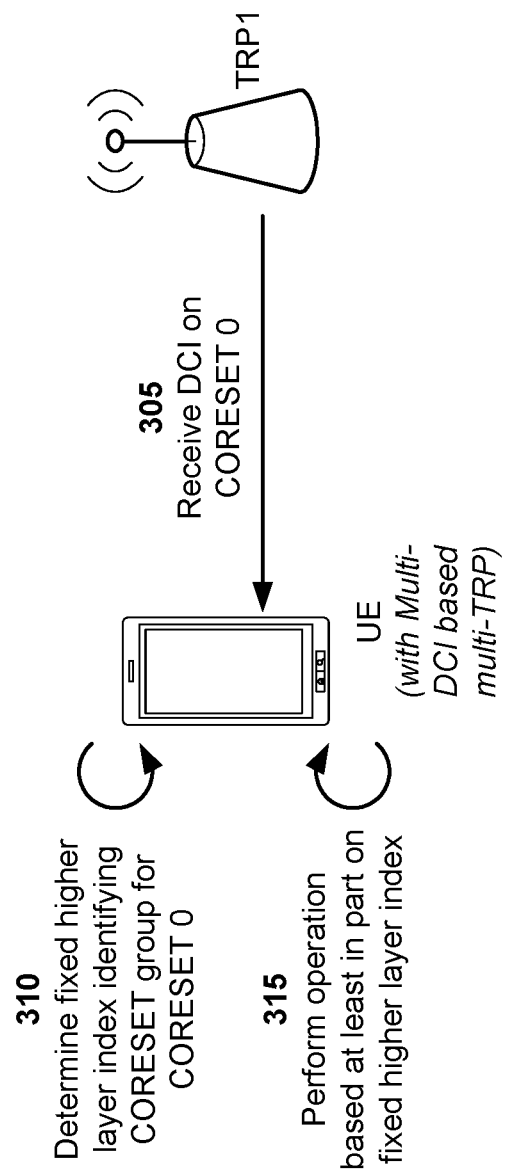

As shown in FIG. 3B, and by reference number 305, the UE (e.g., configured with multi-DCI based multi-TRP operation) may receive DCI on CORESET 0. In some aspects, the DCI may schedule a PDSCH. In some aspects, the DCI may schedule a PUSCH. Notably, while CORESET 0 is identified in the example shown in FIG. 3B, the operations described in FIG. 3B can be applied to any particular CORESET, such as any CORESET used for a special purpose.

As shown by reference number 310, the UE may determine, based at least in part on the UE being configured with multi-DCI based multi-TRP operation, a fixed higher layer index that identifies a CORESET group with which CORESET 0 is associated.

In some aspects, the fixed higher layer index may correspond to a first CORESET group of a set of CORESET groups. Here, the first CORESET group may be associated with a first TRP of a set of TRPs (e.g., a first TRP with which the UE establishes a connection). For example, the UE may be configured to communicate with TRP1 and then TRP2, and these TRPs may be associated with a first CORESET group (e.g., corresponding to index 0) and a second CORESET group (e.g., corresponding to index 1), respectively. Here, out of the two CORESET groups, CORESET 0 may belong to the first CORESET group (e.g., index=0). In other words, in some aspects, CORESET 0 may be transmitted by the first TRP (e.g., TRP1). Thus, in some aspects, the UE may determine the fixed higher layer index as a higher layer index of the first CORESET group.

In some aspects, the UE may determine the fixed higher layer index based at least in part on a radio resource control (RRC) configuration. For example, the UE may receive an RRC configuration that determines the association of CORESET 0 with a fixed higher layer index (e.g., index=0 or index=1). In some aspects, when the fixed higher layer index has not been configured (e.g., when no RRC configuration has been received), the UE may determine the fixed higher layer index based at least in part on an assumption (e.g., a default assumption configured on the UE). In some aspects, the assumption may be that the fixed higher layer index corresponds to the first CORESET group (e.g., the CORESET group associated with the first TRP). As a particular example, a UE may be configured by a higher layer parameter PDCCH-Config that contains two different values of CORESETPoolIndex in ControlResourceSet (i.e., the UE may be configured with multi-DCI based multi-TRP operation), and the UE may expect to receive multiple PDCCHs scheduling fully/partially/non-overlapped PDSCHs in the time and frequency domains. Here, the UE may expect the reception of full/partially-overlapped PDSCHs in time only when PDCCHs that schedule two PDSCHs are associated to different ControlResourceSets having different values of CORESETPoolIndex. For a ControlResourceSet without CORESETPoolIndex, the UE may assume that the ControlResourceSet is assigned with CORESETPoolIndex as 0. In this example, a CORESETPoolIndex value corresponds to a CORESET group/fixed higher layer index. Thus, if a CORESET is associated with a first value of CORESETPoolIndex (e.g., 0), then the CORESET belongs to the first CORESET group and corresponds to the first TRP. Similarly, if a CORESET is associated with a second value of CORESETPoolIndex (e.g., 1), the CORESET belongs to the second CORESET group and corresponds to the second TRP.

As further shown in FIG. 3B, and by reference 315, the UE may perform an operation, associated with receiving the PDSCH or transmitting the PUSCH, based at least in part on the fixed higher layer index identifying the CORESET group with which CORESET 0 is associated. In other words, association of CORESET 0 with a particular fixed higher layer index may be used in association with performing one or more operations when DCI scheduling a PDSCH or a PUSCH on CORESET 0 is received by the UE. In some aspects, the operation may include, for example, an operation associated with a hybrid automatic repeat request (HARQ)-Ack codebook and transmission (e.g., for joint or separate feedback), PDSCH scrambling, rate matching around the PDSCH (i.e., association with one of the first sets of rate matching parameters corresponding to the resources configured for rate matching for the first TRP or the second sets of rate matching parameters corresponding to the resources configured for rate matching for the second TRP), and/or the like. In this way, the UE may determine, based at least in part on being configured with multi-DCI based multi-TRP operation, a fixed higher layer index that identifies a CORESET group with which a particular CORESET (e.g., CORESET 0) is associated, and may perform one or more associated operations accordingly.

As indicated above, another scenario in which operation of a UE configured with multi-DCI based multi-TRP operation needs to be defined is associated with determining a QCL for a PDSCH when there is not enough time between a DCI scheduling the PDSCH and the PDSCH when at least one configured TCI state for a serving cell of the PDSCH includes a particular QCL type (e.g., QCL Type D).

Figure 3C:
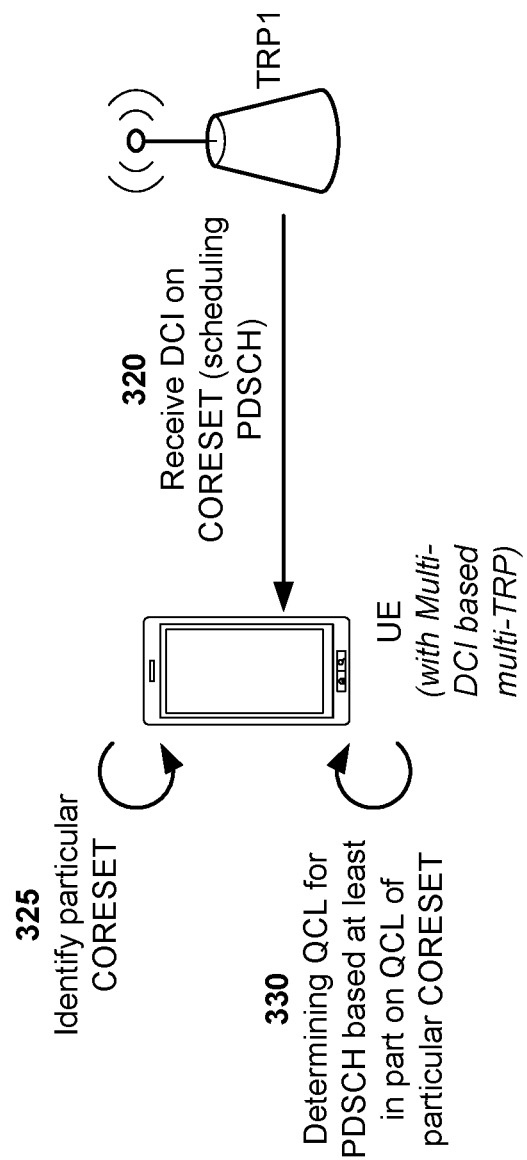

As shown in FIG. 3C, and by reference number 320, the UE (configured with multi-DCI based multi-TRP operation) may receive DCI on a CORESET that schedules a PDSCH. For example, as shown in FIG. 3C, the UE may receive, from TRP1, DCI on a CORESET, where the CORESET schedules a PDSCH.

As shown by reference number 325, the UE may identify, based at least in part on receiving the DCI on the CORESET and based at least in part on the UE being configured with multi-DCI based multi-TRP operation, a particular CORESET. In some aspects, the UE may identify the particular CORESET as a CORESET that has (1) a lowest CORESET identifier associated with a monitored search space among a set of CORESETs in a latest slot monitored by the UE, and (2) a same higher layer index as the CORESET on which the DCI was received.

As shown by reference number 330, the UE may determine a QCL for the PDSCH based at least in part on a QCL of the particular CORESET. For example, the UE may determine the QCL for the PDSCH to be a same QCL as that of the particular CORESET. In some aspects, the UE may then receive the PDSCH based at least in part on the determined QCL for the PDSCH.

In some aspects, the UE may determine the QCL for the PDSCH based at least in part on the QCL of the particular CORESET and based at least in part on one or more other determinations. The one or more other determinations may include, for example, a determination that an offset between reception of the DCI and the PDSCH is less than an offset threshold (e.g., an offset between the reception of the DCI and the PDSCH is less than the threshold timeDurationForQCL) and/or a determination that at least one configured TCI state for a serving cell of the PDSCH includes a particular QCL type (e.g., QCL Type D). In other words, in some aspects, the UE may determine the QCL for the PDSCH to be the same as the particular CORESET when the offset is less than the offset threshold and when at least one configured TCI state for the serving cell of the PDSCH includes the particular QCL type. In this way, a UE configured with multi-DCI based multi-TRP operation may identify a particular CORESET based at least in part on receiving DCI on a CORESET that schedules a PDSCH, and determine a QCL for the PDSCH based at least in part on a QCL of the particular CORESET.

As a particular example of the above scenario, if a UE configured by higher layer parameter PDCCH-Config that contains two different values of CORESETPoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL, the UE may assume that the DMRS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active bandwidth part of the serving cell are monitored by the UE.

Figure 3D:
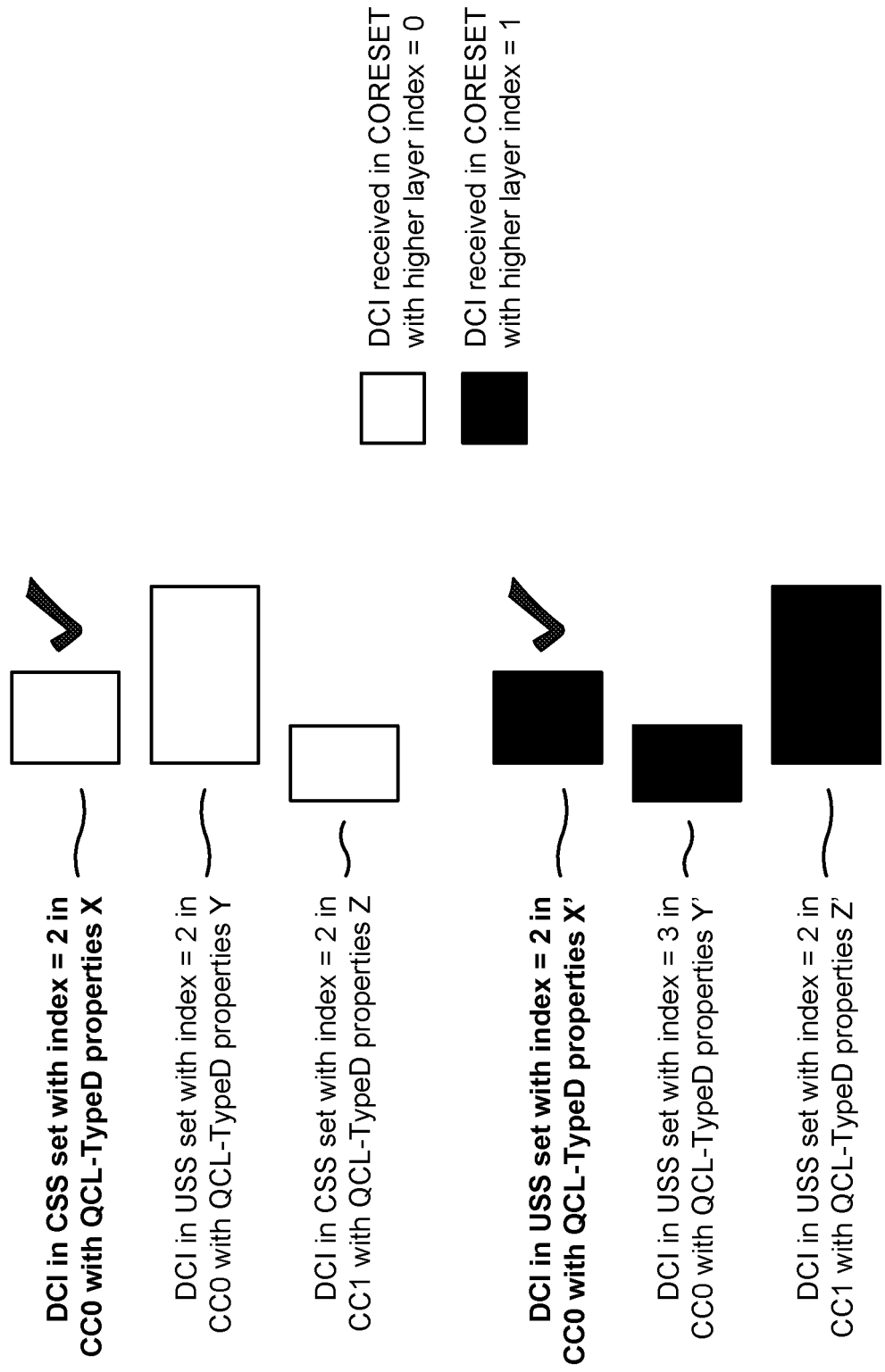

In some cases, as indicated above, the UE configured with multi-DCI based multi-TRP operation needs to prioritize reception of transmissions when the transmissions overlap (e.g., in at least one symbol). FIG. 3D is a diagram associated with an example in which a UE is to monitor PDCCH candidates in overlapping PDCCH monitoring occasions in multiple CORESETs having different QCL type properties on active downlink bandwidth parts of one or more cells.

As illustrated in FIG. 3D, the UE configured with multi-DCI based multi-TRP operation may determine that the UE needs to monitor PDCCH candidates in overlapping PDCCH monitoring occasions in multiple control CORESETs having different QCL type properties on active downlink bandwidth parts of one or more cells. For example, as shown in FIG. 3D, the UE may determine that the UE is to monitor PDCCH candidates in overlapping PDCCH monitoring occasions in multiple CORESETS in a first CORESET group (e.g., associated with higher layer index 0 and corresponding to first TRP). The PDCCH monitoring occasions in the multiple CORESETs in the first CORESET group are identified by the white boxes in FIG. 3D. Similarly, the UE may determine that the UE is to monitor PDCCH candidates in overlapping PDCCH monitoring occasions in multiple CORESETS in a second CORESET group (e.g., associated with higher layer index 1 and corresponding to a second TRP). The PDCCH monitoring occasions in the multiple CORESETs in the second CORESET group are identified by the black boxes in FIG. 3D.

As shown, the multiple CORESETs in each group may have different QCL type properties (e.g., QCL type properties X, Y, Z among CORESETs in the first CORESET group, and QCL type properties X', Y', Z' among CORESETS in the second CORESET group) on active bandwidth parts of one or more cells (e.g., CC0, CC1). In some aspects, the different QCL type properties may be different QCL Type D properties. In some aspects, the one or more cells may be in a same frequency band. In this example, the UE should prioritize monitoring of the PDCCH candidates associated with a given CORESET group and, potentially, among CORESET groups (e.g., when the UE is incapable of concurrently receiving at least two channels with different QCL type properties).

In some aspects, the UE may determine a set of prioritized CORESETs, where each of the set of prioritized CORESETs is included in a respective CORESET group of a set of CORESET groups. For example, when the UE is capable of concurrently receiving at least two channels with different QCL type properties, the UE may determine a set of prioritized CORESETs comprising a prioritized CORESET included in the first CORESET group and a prioritized CORESET included in the second CORESET group. In some aspects, the UE may determine a respective prioritized CORESET for each CORESET group based at least in part on a priority rule.

In some aspects, the priority rule may prioritize CORESETs corresponding to common search spaces (CSS) over CORESETs corresponding to UE-specific search spaces (USS). In some aspects, the priority rule may prioritize CORESETs corresponding to search spaces with lower search space set indices in cells having lower cell indices. In some aspects, the priority rule may be applied based at least in part on QCL type properties being different among at least two of the multiple CORESETs. In some aspects, the priority rule may be applied based at least in part on QCL type properties being different among at least three of the multiple CORESETs.

In the example shown in FIG. 3D, the UE is capable of concurrently receiving at least two channels with different QCL type properties. Here, the priority rule may indicate that the UE is to prioritize CSS over USS, and CORESETS corresponding to search spaces with lower search space indices in cells having lower cell indices. Thus, the UE, based at least in part on the priority rule, may determine the set of prioritized CORESETs to include the top CORESET in the first CORESET group since, for example, the top CORESET in the first CORESET group corresponds to a common search space (rather than a UE-specific search space) and has a lowest index (e.g., 2) in a cell with a lowest index (e.g., CC0) among the CORESETs in the first CORESET group. Further, the UE, based at least in part on the priority rule, may determine the set of prioritized CORESETs to include the top CORESET in the second CORESET group since, for example, the top CORESET in the first CORESET group has a lowest index (e.g., 2) in a cell with a lowest index (e.g., CC0) among the CORESETs in the second CORESET group.

In some aspects, the UE may monitor the one or more PDCCH candidates in the determined set of prioritized CORESETs in order to, for example, receive PDCCH in each of the set of prioritized CORESETs.

In some aspects, the UE may monitor one or more PDCCH candidates in one or more other CORESETs when the one or more other CORESETs have the same QCL type properties as a prioritized CORESET associated with a CORESET group. For example, when a first CORESET and a second CORESET have the same QCL type properties, and the first CORESET is identified as the prioritized CORESET for a CORESET group, the UE may monitor one or more PDCCH candidates in the first CORESET and one or more PDCCH candidates in the second CORESET (e.g., since the second CORESET has the same QCL type properties as the first CORESET). In some aspects, the one or more other CORESETS may be in the same CORESET group as the prioritized CORESET or may be in a different CORESET group than the prioritized CORESET.

In some aspects, the UE may be capable of concurrently receiving at least two channels with different QCL type properties. In such cases, the UE may monitor one or more PDCCH candidates in prioritized CORESETs associated with at least two channels with different QCL type properties.

Conversely, in some aspects, the UE may be incapable of concurrently receiving at least two channels with different QCL type properties. In such a case, a prioritization among CORESET may be needed. In some aspects, the UE may prioritize a particular CORESET group (over one or more other CORESET groups) based at least in part on the UE being incapable of concurrently receiving at least two channels with different QCL type properties. In some aspects, the particular CORESET group may be prioritized based at least in part on the particular CORESET group being associated with a particular higher layer index (e.g., index=0). In some aspects, the particular CORESET group may be prioritized based at least in part on a particular CORESET (e.g., CORESET 0) being included in the particular CORESET group.

Figure 3E:
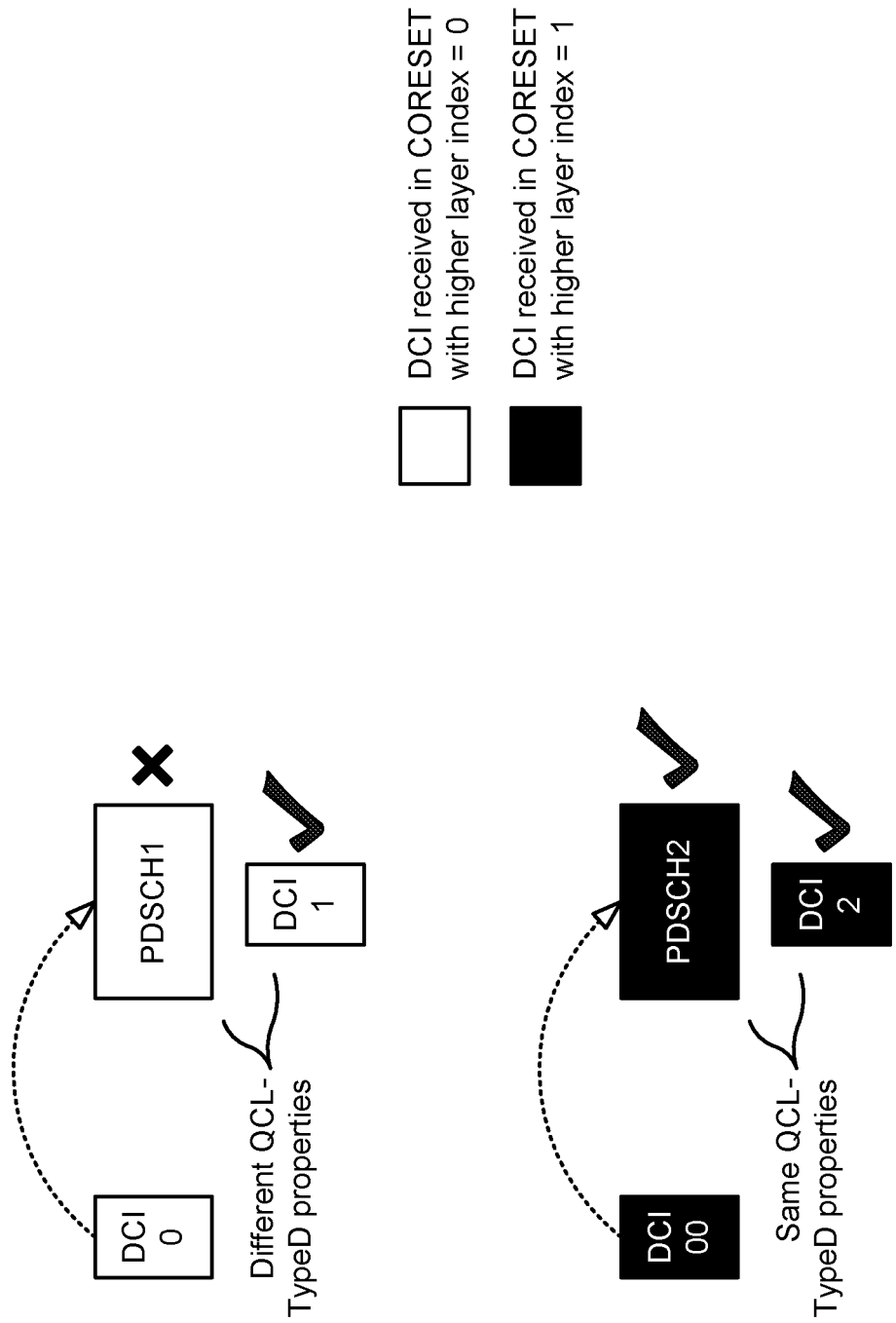

FIG. 3E is a diagram associated with an example of prioritization for a case in which a UE is to receive a PDSCH that is scheduled (or activated in the case of semi-persistent scheduling (SPS)) with DCI received on a CORESET included in a first CORESET group (i.e., is associated with a first higher layer index associated with the first TRP) and a PDCCH (e.g., DCI) that is to be received on another CORESET in the same CORESET group.

In some aspects, the UE configured with multi-DCI based multi-TRP operation may receive DCI including an indication to receive the PDSCH. In some aspects, the UE may receive the DCI on a first CORESET. Here, the UE may determine that the PDSCH overlaps with a PDCCH (e.g., DCI) to be received by the UE on a second CORESET. Next, the UE may determine that the first CORESET and the second CORESET are in a same CORESET group. The UE may then selectively prioritize reception of the PDSCH or the PDCCH based at least in part on a priority rule and based at least in part on the first CORESET and the second CORESET being in the same CORESET group. In some aspects, the first CORESET may be associated with a first cell in a frequency band and the second CORESET may be associated with a second cell in the frequency band.

In some aspects, the priority rule may prioritize reception of the PDCCH over reception of the PDSCH when a QCL of the PDSCH and a QCL of the second CORESET have different QCL type properties (e.g., different QCL Type D properties). Alternatively, in some aspects, the priority rule may prioritize reception of the PDSCH over reception of the PDCCH when the QCL of the PDSCH and the QCL of the second CORESET have different QCL type properties. In some aspects, the priority rule may permit reception of both the PDSCH and the PDCCH when the QCL of the PDSCH and the QCL of the second CORESET have the same QCL type properties.

In some aspects, the UE may be capable of concurrently receiving at least two channels with QCL type properties, and may prioritize reception among different CORESET groups. For example, as shown in FIG. 3E, the UE may determine that the UE is to receive PDSCH1, scheduled by DCI in a first CORESET in a first CORESET group (e.g., corresponding to higher layer index 0 and associated with a first TRP), that overlaps with a PDCCH (e.g., DCI1) in a second CORESET of the first CORESET group. PDSCH1, DCI0, and DCI1 associated with the first CORESET group are identified by the white boxes in FIG. 3E. Similarly, the UE may determine that the UE is to receive PDSCH2, scheduled by DCI00 in a first CORESET in a second CORESET group (e.g., corresponding to higher layer index 1 and associated with a second TRP), that overlaps with PDCCH (e.g., DCI2) in a second CORESET of the second CORESET group. PDSCH2, DCI00, and DCI2, associated with the second CORESET group, are identified by the black boxes in FIG. 3E. In this example, the priority rule indicates that the reception of a PDCCH is prioritized over DCI when QCL type properties of a QCL of the PDSCH (i.e., corresponding to the QCL of the CORESET carrying DCI scheduling the PDSCH) differ from the QCL type properties of a QCL of the second CORESET, and that reception of both the PDSCH and the PDCCH is permitted when the QCL of the PDSCH and the QCL of the second CORESET have the same QCL type properties. Thus, as indicated in the FIG. 3E, the UE may prioritize reception of DCI1 over reception of PDSCH1 (e.g., since the QCL type properties differ among the QCLs of PDSCH1 and the second CORESET in the first CORESET group), and may receive both PDSCH2 and DCI2 (e.g., since the QCL type properties are the same between QCLs of PDSCH2 and the second CORESET in the second CORESET group).

In some aspects, the UE may be capable of concurrently receiving at least two channels with different QCL type properties. In such cases, the UE may receive separate transmissions (e.g., PDSCH and/or PDCCH) associated with at least two channels with different QCL type properties, as illustrated in the above example.

Conversely, in some aspects, the UE may be incapable of concurrently receiving at least two channels with different QCL type properties. In such a case, the UE may prioritize reception among the CORESET groups. In some aspects, the UE may prioritize a given CORESET group over another CORESET group based at least in part on the CORESET group being associated with a particular higher layer index (e.g., index=0). In some aspects, the UE may prioritize the CORESET group based at least in part on a particular CORESET (e.g., CORESET 0) being included in the CORESET group.

Figure 3F:
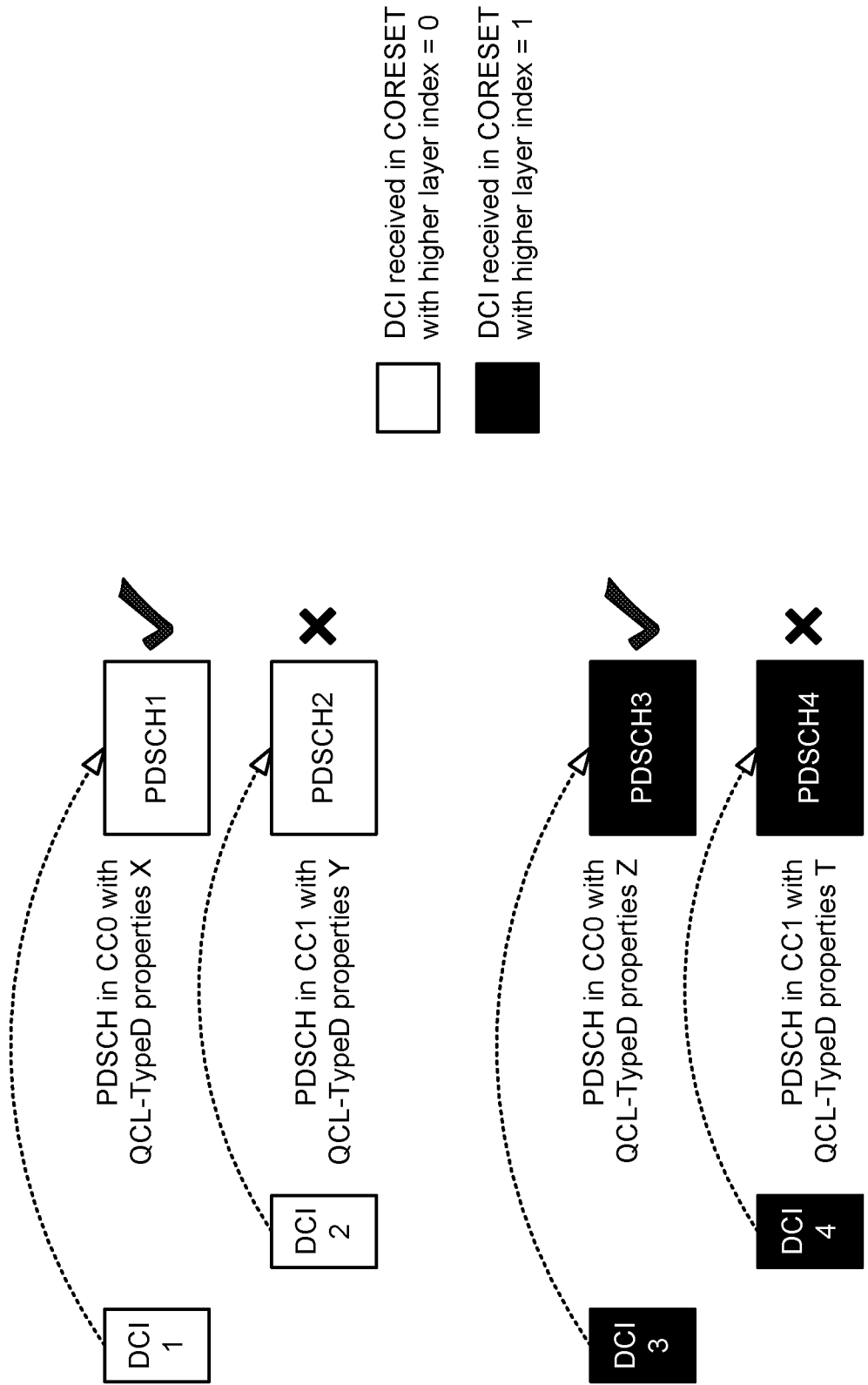

FIG. 3F is a diagram associated with an example of prioritization for a case in which a UE is to receive a first PDSCH on a first cell, associated with a frequency band, that overlaps with a second PDSCH to be received on a second cell associated with the frequency band, where the first PDSCH is associated with first DCI received on a first CORESET and the second PDSCH is associated with second DCI received on a second CORESET.

In some aspects, the UE configured with multi-DCI based multi-TRP operation may determine that the first PDSCH, to be received on the first cell associated with the frequency band, overlaps with the second PDSCH to be received on the second cell associated with the frequency band. Here, as indicated above, the first PDSCH may be associated with first DCI received on a first CORESET, and the second PDSCH may be associated with second DCI received on a second CORESET. In some aspects, the UE may determine that the first CORESET and the second CORESET are included in a same CORESET group. Next, the UE may prioritize reception of the first PDSCH or the second PDSCH based at least in part on a priority rule and based at least in part on determining that the first CORESET and the second CORESET are included in the same CORESET group. In some aspects, the first CORESET and the second CORESET may have different QCL type properties (e.g., different QCL Type D properties).

In some aspects, the priority rule may prioritize reception of a PDSCH in a cell with a lowest index. In some aspects, the priority rule may prioritize reception of PDSCHs associated with DCI received on CORESETs corresponding to common search spaces over reception of PDSCHs associated with DCI received on CORESETS corresponding to UE-specific search spaces. In some aspects, the priority rule may prioritize reception of PDSCHs associated with DCI received on CORESETs corresponding to search spaces with lower search space set indices. In some aspects, the priority rule may prioritize reception of PDSCHs associated with DCI received on CORESETs associated with cells having lower cell indices.

In some aspects, the UE may be capable of concurrently receiving at least two channels with QCL type properties, and may prioritize reception among different CORESET groups. For example, as shown in FIG. 3F, the UE may determine that the UE is to receive PDSCH1, scheduled by DCI1 in a first CORESET in a first CORESET group (e.g., corresponding to higher layer index 0 and associated with a first TRP), that overlaps with PDSCH2 scheduled by DCI2 in a second CORESET of the first CORESET group. PDSCH1, PDSCH2, DCI1, and DCI2 associated with the first CORESET group are identified by the white boxes in FIG. 3F. Similarly, the UE may determine that the UE is to receive PDSCH3, scheduled by DCI3 in a first CORESET in a second CORESET group (e.g., corresponding to higher layer index 1 and associated with a second TRP), that overlaps with PDSCH4 scheduled by DCI4 in a second CORESET of the second CORESET group. PDSCH3, PDSCH4, DCI3, and DCI4 associated with the second CORESET group are identified by the black boxes in FIG. 3F. In this example, the priority rule prioritizes reception of a PDSCH in a cell with a lowest index. Thus, as indicated in FIG. 3F, the UE may prioritize reception of PDSCH1 over reception of PDSCH2 (e.g., since the cell index associated with PDSCH1, CC0, is lower than the cell index associated with PDSCH2, CC1), and may prioritize reception of PDSCH3 over reception of PDSCH4 (e.g., since the cell index associated with PDSCH3, CC0, is lower than the cell index associated with PDSCH4, CC1).

In some aspects, the UE may be capable of concurrently receiving at least two channels with different QCL type properties. In such cases, the UE may receive separate PDSCHs associated with at least two channels with different QCL type properties, as illustrated in the above example.

Conversely, in some aspects, the UE may be incapable of concurrently receiving at least two channels with different QCL type properties. In such a case, the UE may prioritize reception among the CORESET groups. In some aspects, the UE may prioritize a given CORESET group over another CORESET group based at least in part on the CORESET group being associated with a particular higher layer index (e.g., index=0). In some aspects, the UE may prioritize the CORESET group based at least in part on a particular CORESET (e.g., CORESET 0) being included in the CORESET group.

As indicated above, FIGS. 3A-3F are provided as examples. Other examples may differ from what is described with respect to FIGS. 3A-3F.

Figure 4:
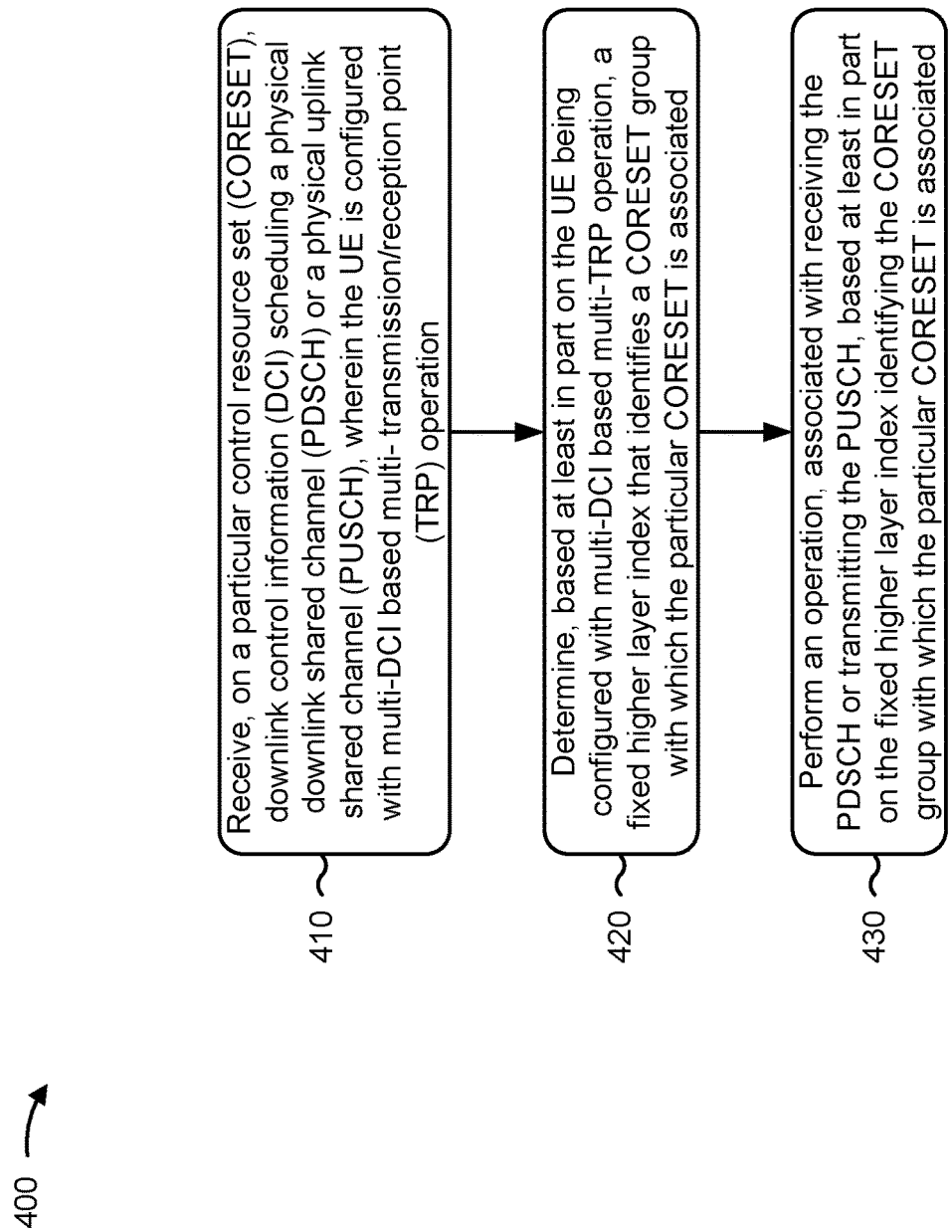
FIGS. 4-8 are diagrams illustrating example processes performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with QCL related priority rules for multi-DCI based multi-TRP operation.

As shown in FIG. 4, in some aspects, process 400 may include receiving, on a particular CORESET, DCI scheduling a PDSCH or a PUSCH, wherein the UE is configured with multi-DCI based multi-TRP operation (block 410). For example, the UE (e.g., using antenna 252, receive processor 258, controller/processor 280, memory 282, and/or the like) may receive, on a particular CORESET, DCI scheduling a PDSCH or a PUSCH, wherein the UE is configured with multi-DCI based multi-TRP operation, as described above in connection with FIGS. 3A-3F.

As further shown in FIG. 4, in some aspects, process 400 may include determining, based at least in part on the UE being configured with multi-DCI based multi-TRP operation, a fixed higher layer index that identifies a CORESET group with which the particular CORESET is associated (block 420). For example, the UE (e.g., using receive processor 258, controller/processor 280, memory 282, and/or the like) may determine, based at least in part on the UE being configured with multi-DCI based multi-TRP operation, a fixed higher layer index that identifies a CORESET group with which the particular CORESET is associated, as described above in connection with FIGS. 3A-3F.

As further shown in FIG. 4, in some aspects, process 400 may include performing an operation, associated with receiving the PDSCH or transmitting the PUSCH, based at least in part on the fixed higher layer index identifying the CORESET group with which the particular CORESET is associated (block 430). For example, the UE (e.g., using receive processor 258, transmit processor 264, controller/processor 280, memory 282, and/or the like) may perform an operation, associated with receiving the PDSCH or transmitting the PUSCH, based at least in part on the fixed higher layer index identifying the CORESET group with which the particular CORESET is associated, as described above in connection with FIGS. 3A-3F.

Process 400 may include additional aspects, such as any single aspect or any combination of aspects described below and/or in connection with one or more other processes described elsewhere herein.

In a first aspect, the particular CORESET is CORESET 0.

In a second aspect, alone or in combination with the first aspect, the fixed higher layer index corresponds to a first CORESET group of a set of CORESET groups. Here, the first CORESET group is associated with a first TRP of a set of TRPs.

In a third aspect, alone or in combination with one or more of the first and second aspects, the fixed higher layer index is determined based at least in part on a radio resource control (RRC) configuration.

In a fourth aspect, alone or in combination with one or more of the first through third aspects, when the fixed higher layer index has not been configured, the fixed higher layer index is determined based at least in part on an assumption.

In a fifth aspect, alone or in combination with one or more of the first through fourth aspects, the assumption is that the fixed higher layer index corresponds to a first CORESET group, of a set of CORESET groups. Here, the first CORESET group is associated with a first TRP of a set of TRPs.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
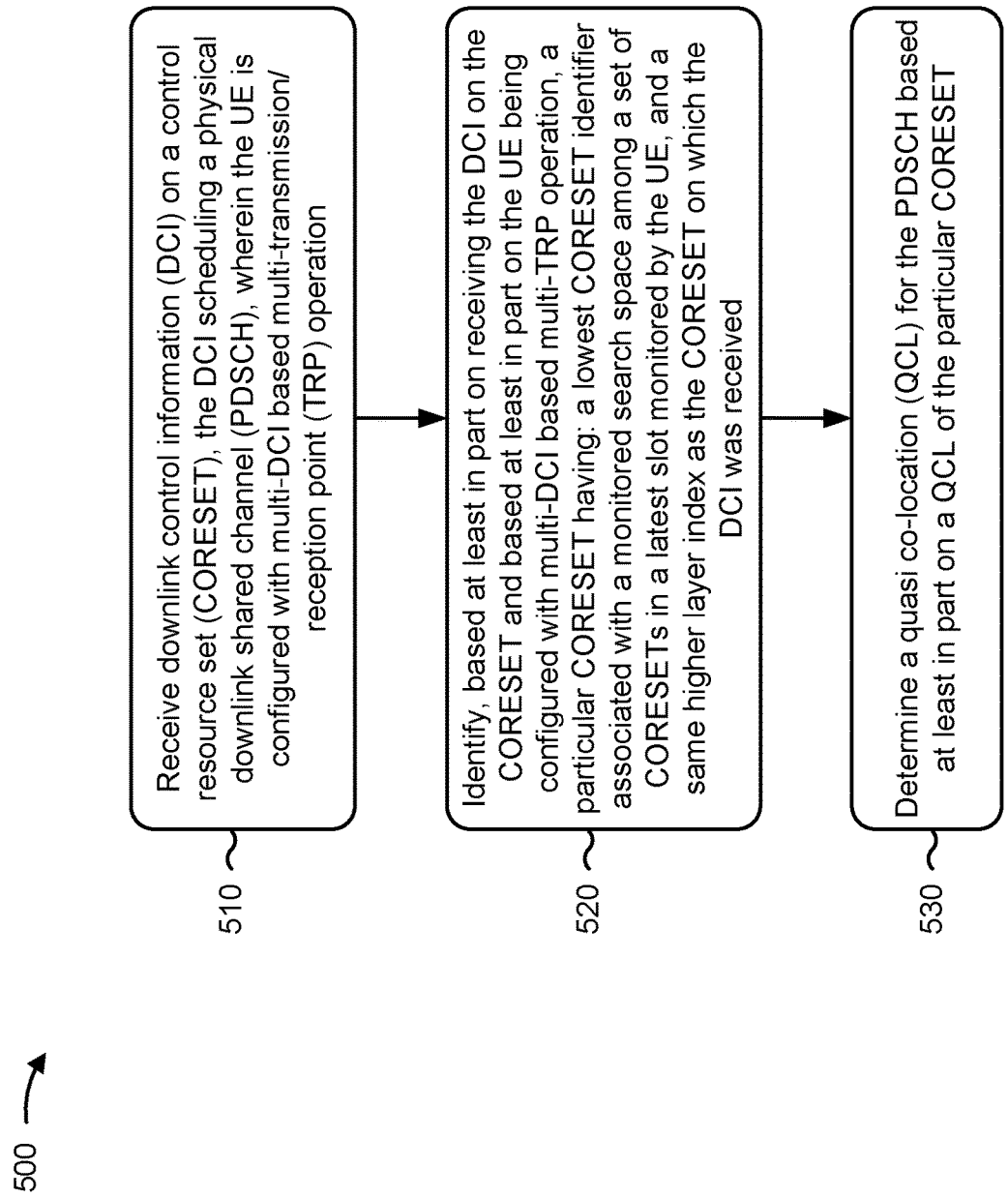

FIG. 5 is a diagram illustrating an example process 500 performed, for example, by a UE, in accordance with various aspects of the present disclosure. Example process 500 is an example where a UE (e.g., UE 120 and/or the like) performs operations associated with QCL related priority rules for multi-DCI based multi-TRP operation.

As shown in FIG. 5, in some aspects, process 500 may include receiving DCI on a CORESET, the DCI scheduling a PDSCH, wherein the UE is configured with multi-DCI based multi-TRP operation (block 510). For example, the UE (e.g., using antenna 252, receive processor 258, controller/processor 280, memory 282, and/or the like) may receive DCI on a CORESET, the DCI scheduling a PDSCH, wherein the UE is configured with multi-DCI based multi-TRP) operation, as described above in connection with FIGS. 3A-3F.

As further shown in FIG. 5, in some aspects, process 500 may include identifying, based at least in part on receiving the DCI on the CORESET and based at least in part on the UE being configured with multi-DCI based multi-TRP operation, a particular CORESET having a lowest CORESET identifier associated with a monitored search space among a set of CORESETs in a latest slot monitored by the UE and a same higher layer index as the CORESET on which the DCI was received (block 520). For example, the UE (e.g., using receive processor 258, controller/processor 280, memory 282, and/or the like) may identify, based at least in part on receiving the DCI on the CORESET and based at least in part on the UE being configured with multi-DCI based multi-TRP operation, a particular CORESET having a lowest CORESET identifier associated with a monitored search space among a set of CORESETs in a latest slot monitored by the UE and a same higher layer index as the CORESET on which the DCI was received, as described above in connection with FIGS. 3A-3F.

As further shown in FIG. 5, in some aspects, process 500 may include determining a quasi co-location (QCL) for the PDSCH based at least in part on a QCL of the particular CORESET (block 530). For example, the UE (e.g., using receive processor 258, transmit processor 264, controller/processor 280, memory 282, and/or the like) may determine a QCL for the PDSCH based at least in part on a QCL of the particular CORESET, as described above in connection with FIGS. 3A-3F.

Process 500 may include additional aspects, such as any single aspect or any combination of aspects described below and/or in connection with one or more other processes described elsewhere herein.

In a first aspect, the QCL for the PDSCH is determined to be a same QCL as that of the particular CORESET.

In a second aspect, alone or in combination with the first aspect, the PDSCH is received based at least in part on the determined QCL for the PDSCH.

In a third aspect, alone or in combination with one or more of the first and second aspects, the QCL for the PDSCH is determined based at least in part on the QCL of the particular CORESET further based at least in part on a determination that an offset between reception of the DCI and the PDSCH is less than an offset threshold.

In a fourth aspect, alone or in combination with one or more of the first through third aspects, the QCL for the PDSCH is determined based at least in part on the QCL of the particular CORESET further based at least in part on a determination that at least one configured transmission configuration indicator (TCI) state for a serving cell of the PDSCH includes a particular QCL type.

In a fifth aspect, alone or in combination with one or more of the first through fourth aspects, the particular QCL type is QCL Type D.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
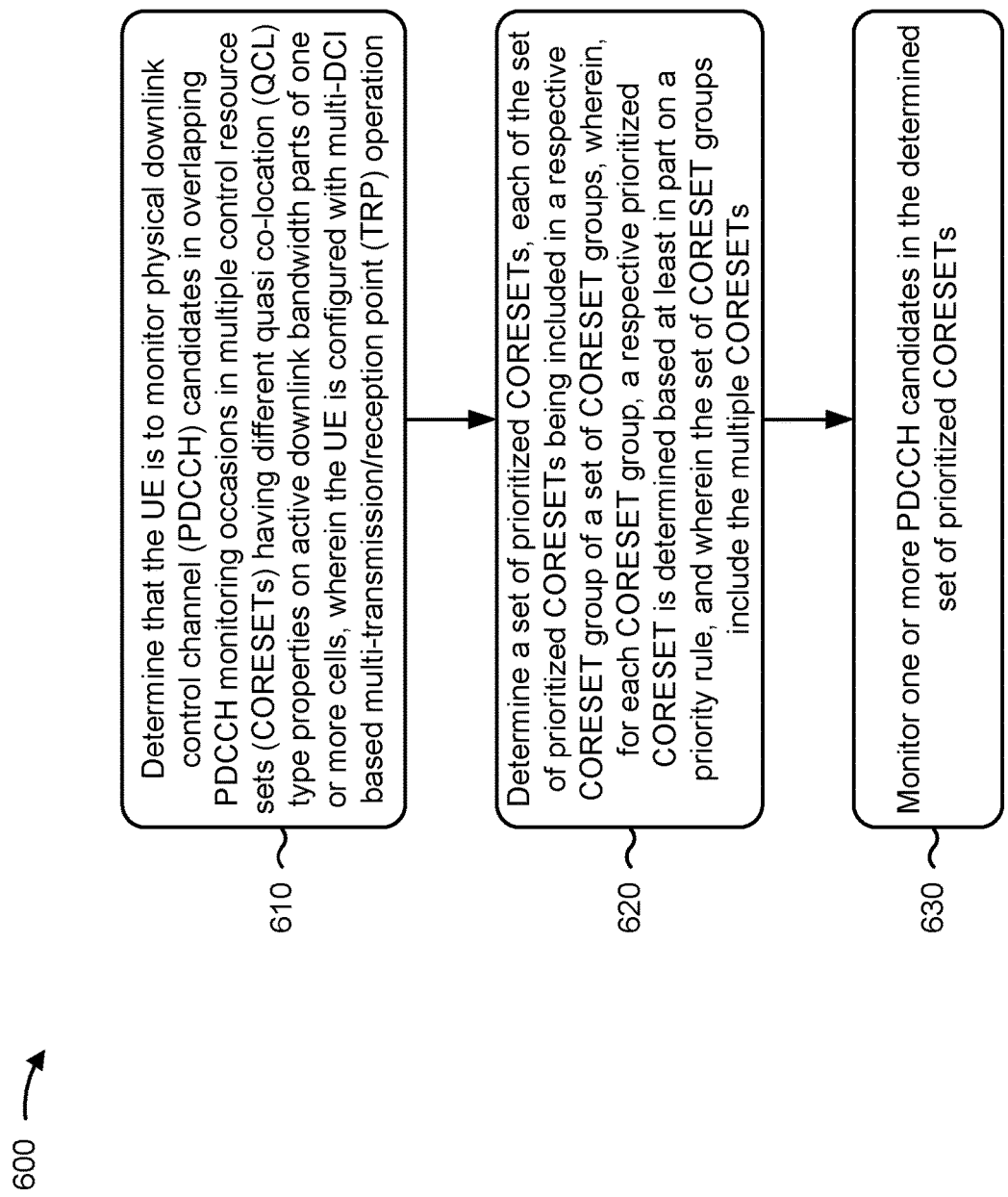

FIG. 6 is a diagram illustrating an example process 600 performed, for example, by a UE, in accordance with various aspects of the present disclosure. Example process 600 is an example where a UE (e.g., UE 120 and/or the like) performs operations associated with QCL related priority rules for multi-DCI based multi-TRP operation.

As shown in FIG. 6, in some aspects, process 600 may include determining that the UE is to monitor PDCCH candidates in overlapping PDCCH monitoring occasions in multiple CORESETs having different QCL type properties on active downlink bandwidth parts of one or more cells, wherein the UE is configured with multi-DCI based multi-TRP operation (block 610). For example, the UE (e.g., using receive processor 258, controller/processor 280, memory 282, and/or the like) may determine that the UE is to monitor PDCCH candidates in overlapping PDCCH monitoring occasions in multiple CORESETs having different QCL type properties on active downlink bandwidth parts of one or more cells, wherein the UE is configured with multi-DCI based multi-TRP operation, as described above in connection with FIGS. 3A-3F.

As further shown in FIG. 6, in some aspects, process 600 may include determining a set of prioritized CORESETs, each of the set of prioritized CORESETs being included in a respective CORESET group of a set of CORESET groups (block 620). For example, the UE (e.g., using receive processor 258, transmit processor 264, controller/processor 280, memory 282, and/or the like) may determine a set of prioritized CORESETs, as described above in connection with FIGS. 3A-3F. In some aspects, for each CORESET group, a respective prioritized CORESET is determined based at least in part on a priority rule. In some aspects, the set of CORESET groups include the multiple CORESETs.

As further shown in FIG. 6, in some aspects, process 600 may include monitoring one or more PDCCH candidates in the determined set of prioritized CORESETs (block 630). For example, the UE (e.g., using antenna 252, receive processor 258, controller/processor 280, memory 282, and/or the like) may monitor one or more PDCCH candidates in the determined set of prioritized CORESETs, as described above in connection with FIGS. 3A-3F.

Process 600 may include additional aspects, such as any single aspect or any combination of aspects described below and/or in connection with one or more other processes described elsewhere herein.

In a first aspect, the UE is capable of concurrently receiving at least two channels with different QCL type properties.

In a second aspect, alone or in combination with the first aspect, the different QCL type properties are different QCL Type D properties.

In a third aspect, alone or in combination with one or more of the first and second aspects, the one or more cells are in a same frequency band.

In a fourth aspect, alone or in combination with one or more of the first through third aspects, for a given CORESET group of the set of CORESET groups, one or more PDCCH candidates in one or more other CORESETs are monitored, the one or more other CORESETs having the same QCL type properties as a prioritized CORESET associated with the given CORESET group.

In a fifth aspect, alone or in combination with one or more of the first through fourth aspects, the one or more other CORESETs are included in the given CORESET group.

In a sixth aspect, alone or in combination with one or more of the first through fifth aspects, the one or more other CORESETs include a CORESET included in another CORESET group of the set of CORESET groups.

In a seventh aspect, alone or in combination with one or more of the first through sixth aspects, the priority rule prioritizes CORESETs corresponding to common search spaces over CORESETs corresponding to UE-specific search spaces.

In an eighth aspect, alone or in combination with one or more of the first through seventh aspects, the priority rule prioritizes CORESETs corresponding to search spaces with lower search space set indices in cells having lower cell indices.

In a ninth aspect, alone or in combination with one or more of the first through eighth aspects, the priority rule is applied based at least in part on QCL type properties being different among at least two of the multiple CORESETs.

In a tenth aspect, alone or in combination with one or more of the first through ninth aspects, the priority rule is applied based at least in part on QCL type properties being different among at least three of the multiple CORESETs.

In an eleventh aspect, alone or in combination with one or more of the first through tenth aspects, the UE is incapable of concurrently receiving at least two channels with different QCL type properties.

In a twelfth aspect, alone or in combination with one or more of the first through eleventh aspects, a particular CORESET group is prioritized based at least in part on the UE being incapable of concurrently receiving at least two channels with different QCL type properties.

In a thirteenth aspect, alone or in combination with one or more of the first through twelfth aspects, the particular CORESET group is prioritized based at least in part on the particular CORESET group being associated with a particular higher layer index.

In a fourteenth aspect, alone or in combination with one or more of the first through thirteenth aspects, the particular CORESET group is prioritized based at least in part on a particular CORESET being included in the particular CORESET group.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
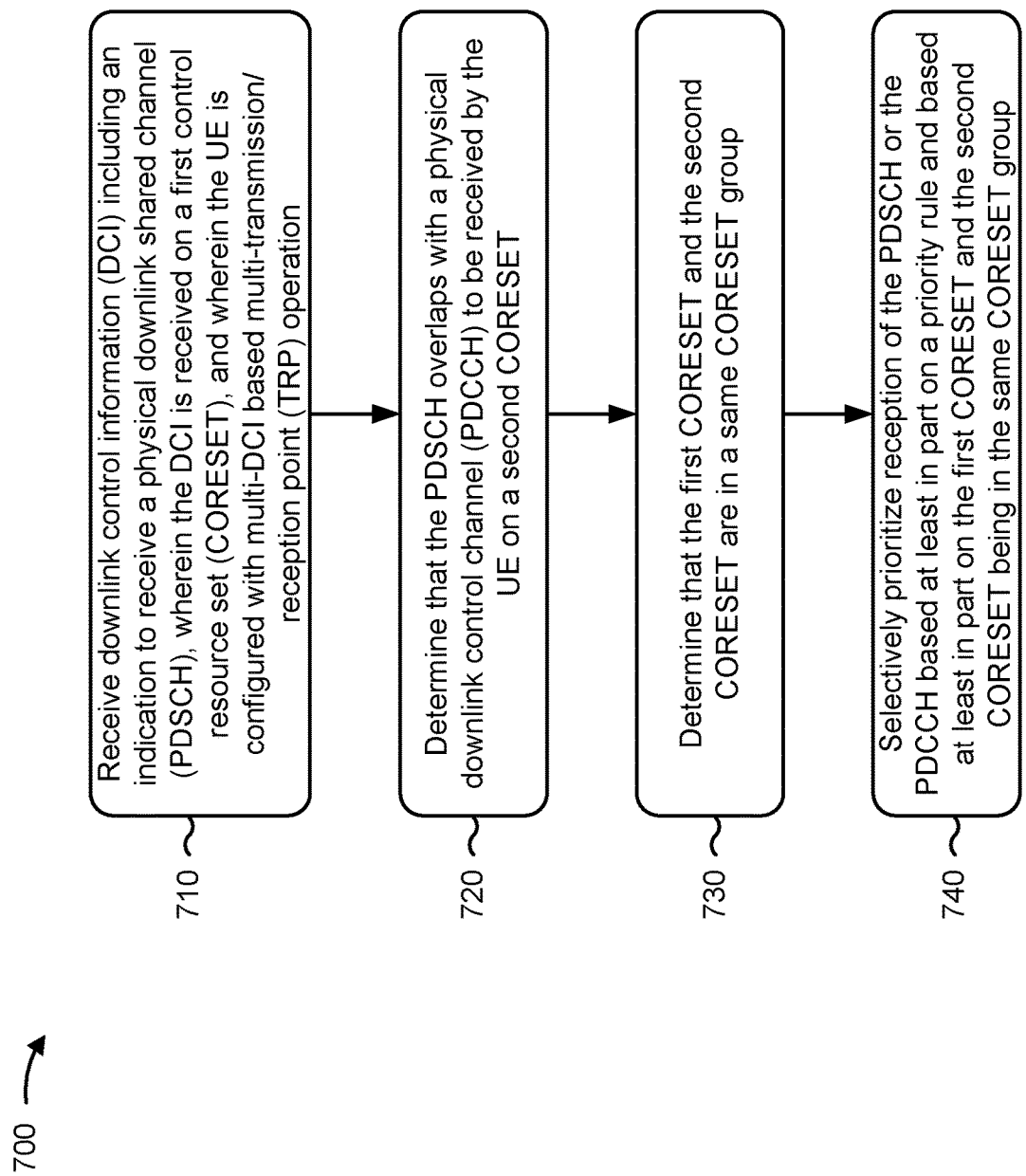

FIG. 7 is a diagram illustrating an example process 700 performed, for example, by a UE, in accordance with various aspects of the present disclosure. Example process 700 is an example where a UE (e.g., UE 120 and/or the like) performs operations associated with QCL related priority rules for multi-DCI based multi-TRP operation.

As shown in FIG. 7, in some aspects, process 700 may include receiving DCI including an indication to receive a PDSCH, wherein the UE is configured with multi-DCI based multi-TRP operation (block 710). For example, the UE (e.g., using antenna 252, receive processor 258, controller/processor 280, memory 282, and/or the like) may receive DCI including an indication to receive a PDSCH, wherein the UE is configured with multi-DCI based multi-TRP operation, as described above in connection with FIGS. 3A-3F. In some aspects, the DCI is received on a first CORESET.

As further shown in FIG. 7, in some aspects, process 700 may include determining that the PDSCH overlaps with a PDCCH to be received by the UE on a second CORESET (block 720). For example, the UE (e.g., using receive processor 258, controller/processor 280, memory 282, and/or the like) may determine that the PDSCH overlaps with a PDCCH to be received by the UE on a second CORESET, as described above in connection with FIGS. 3A-3F.

As further shown in FIG. 7, in some aspects, process 700 may include determining that the first CORESET and the second CORESET are in a same CORESET group (block 730). For example, the UE (e.g., using receive processor 258, transmit processor 264, controller/processor 280, memory 282, and/or the like) may determine that the first CORESET and the second CORESET are in a same CORESET group, as described above in connection with FIGS. 3A-3F.

As further shown in FIG. 7, in some aspects, process 700 may include selectively prioritizing reception of the PDSCH or the PDCCH based at least in part on a priority rule and based at least in part on the first CORESET and the second CORESET being in the same CORESET group (block 740). For example, the UE (e.g., using receive processor 258, controller/processor 280, memory 282, and/or the like) may selectively prioritize reception of the PDSCH or the PDCCH based at least in part on a priority rule and based at least in part on the first CORESET and the second CORESET being in the same CORESET group, as described above in connection with FIGS. 3A-3F.

Process 700 may include additional aspects, such as any single aspect or any combination of aspects described below and/or in connection with one or more other processes described elsewhere herein.

In a first aspect, the UE is capable of concurrently receiving at least two channels with different QCL type properties.

In a second aspect, alone or in combination with the first aspect, the different QCL type properties are different QCL Type D properties.

In a third aspect, alone or in combination with one or more of the first and second aspects, the first CORESET is associated with a first cell in a frequency band and the second CORESET is associated with a second cell in the frequency band.

In a fourth aspect, alone or in combination with one or more of the first through third aspects, the priority rule prioritizes reception of the PDCCH over reception of the PDSCH when a QCL of the PDSCH and a QCL of the second CORESET have different QCL type properties.

In a fifth aspect, alone or in combination with one or more of the first through fourth aspects, the priority rule prioritizes reception of the PDSCH over reception of the PDCCH when a QCL of the PDSCH and a QCL of the second CORESET have different QCL type properties.

In a sixth aspect, alone or in combination with one or more of the first through fifth aspects, the priority rule permits reception of both the PDSCH and the PDCCH when a QCL of the PDSCH and a QCL of the second CORESET have the same QCL type properties.

In a seventh aspect, alone or in combination with one or more of the first through sixth aspects, the UE is incapable of concurrently receiving at least two channels with different QCL type properties.

In an eighth aspect, alone or in combination with one or more of the first through seventh aspects, the CORESET group including the first CORESET and the second CORESET is prioritized based at least in part on the UE being incapable of concurrently receiving at least two channels with different QCL type properties.

In a ninth aspect, alone or in combination with one or more of the first through eighth aspects, the CORESET group is prioritized based at least in part on the CORESET group being associated with a particular higher layer index.

In a tenth aspect, alone or in combination with one or more of the first through ninth aspects, the CORESET group is prioritized based at least in part on a particular CORESET being included in the CORESET group.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
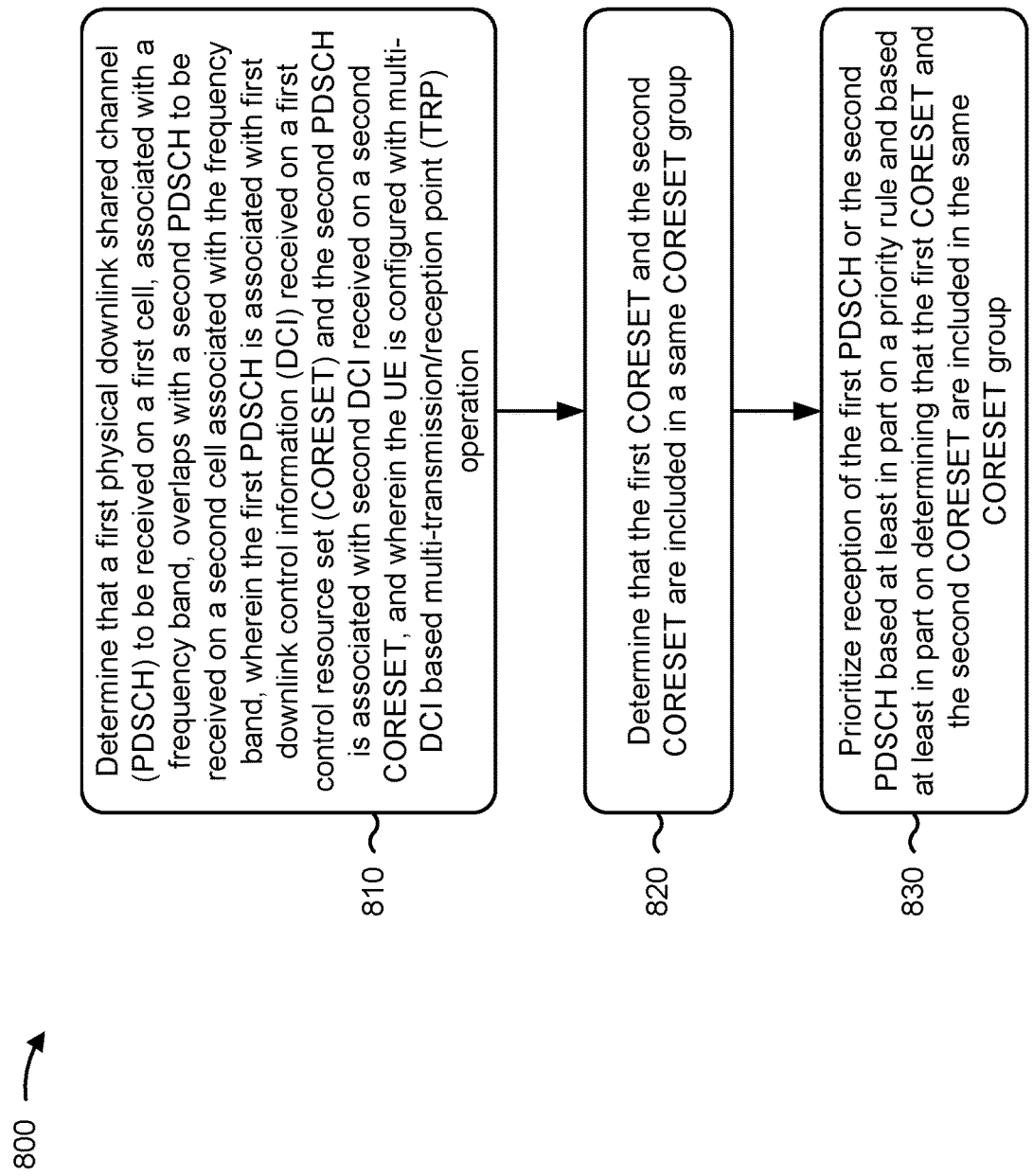

FIG. 8 is a diagram illustrating an example process 800 performed, for example, by a UE, in accordance with various aspects of the present disclosure. Example process 800 is an example where a UE (e.g., UE 120 and/or the like) performs operations associated with QCL related priority rules for multi-DCI based multi-TRP operation.

As shown in FIG. 8, in some aspects, process 800 may include determining that a first PDSCH to be received on a first cell, associated with a frequency band, overlaps with a second PDSCH to be received on a second cell associated with the frequency band, wherein the UE is configured with multi-DCI based multi-TRP operation (block 810). For example, the UE (e.g., using receive processor 258, transmit processor 264, controller/processor 280, memory 282, and/or the like) may determine that a first PDSCH to be received on a first cell, associated with a frequency band, overlaps with a second PDSCH to be received on a second cell associated with the frequency band, wherein the UE is configured with multi-DCI based multi-TRP operation, as described above in connection with FIGS. 3A-3F. In some aspects, the first PDSCH is associated with first DCI received on a first CORESET and the second PDSCH is associated with second DCI received on a second CORESET.

As further shown in FIG. 8, in some aspects, process 800 may include determining that the first CORESET and the second CORESET are included in a same CORESET group (block 820). For example, the UE (e.g., using receive processor 258, controller/processor 280, memory 282, and/or the like) may determine that the first CORESET and the second CORESET are included in a same CORESET group, as described above in connection with FIGS. 3A-3F.

As further shown in FIG. 8, in some aspects, process 800 may include prioritizing reception of the first PDSCH or the second PDSCH based at least in part on a priority rule and based at least in part on determining that the first CORESET and the second CORESET are included in the same CORESET group (block 830). For example, the UE (e.g., using receive processor 258, controller/processor 280, memory 282, and/or the like) may prioritize reception of the first PDSCH or the second PDSCH based at least in part on a priority rule and based at least in part on determining that the first CORESET and the second CORESET are included in the same CORESET group, as described above in connection with FIGS. 3A-3F.

Process 800 may include additional aspects, such as any single aspect or any combination of aspects described below and/or in connection with one or more other processes described elsewhere herein.

In a first aspect, the UE is capable of concurrently receiving at least two channels with different QCL type properties.

In a second aspect, alone or in combination with the first aspect, the first CORESET and the second CORESET have different QCL type properties.

In a third aspect, alone or in combination with one or more of the first and second aspects, the different QCL type properties are different QCL Type D properties.

In a fourth aspect, alone or in combination with one or more of the first through third aspects, the priority rule prioritizes reception of a PDSCH in a cell with a lowest index.

In a fifth aspect, alone or in combination with one or more of the first through fourth aspects, the priority rule prioritizes reception of PDSCHs associated with DCI received on CORESETs corresponding to common search spaces over reception of PDSCHs associated with DCI received on CORESETS corresponding to UE-specific search spaces.

In a sixth aspect, alone or in combination with one or more of the first through fifth aspects, the priority rule prioritizes reception of PDSCHs associated with DCI received on CORESETs corresponding to search spaces with lower search space set indices.

In a seventh aspect, alone or in combination with one or more of the first through sixth aspects, the priority rule prioritizes reception of PDSCHs associated with DCI received on CORESETs associated with cells having lower cell indices.

In an eighth aspect, alone or in combination with one or more of the first through seventh aspects, the UE is incapable of concurrently receiving at least two channels with different QCL type properties.

In a ninth aspect, alone or in combination with one or more of the first through eighth aspects, the CORESET group including the first CORESET and the second CORESET is prioritized based at least in part on the UE being incapable of concurrently receiving at least two channels with different QCL type properties.

In a tenth aspect, alone or in combination with one or more of the first through ninth aspects, the CORESET group is prioritized based at least in part on the CORESET group being associated with a particular higher layer index.

In an eleventh aspect, alone or in combination with one or more of the first through tenth aspects, the CORESET group is prioritized based at least in part on a particular CORESET being included in the CORESET group.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
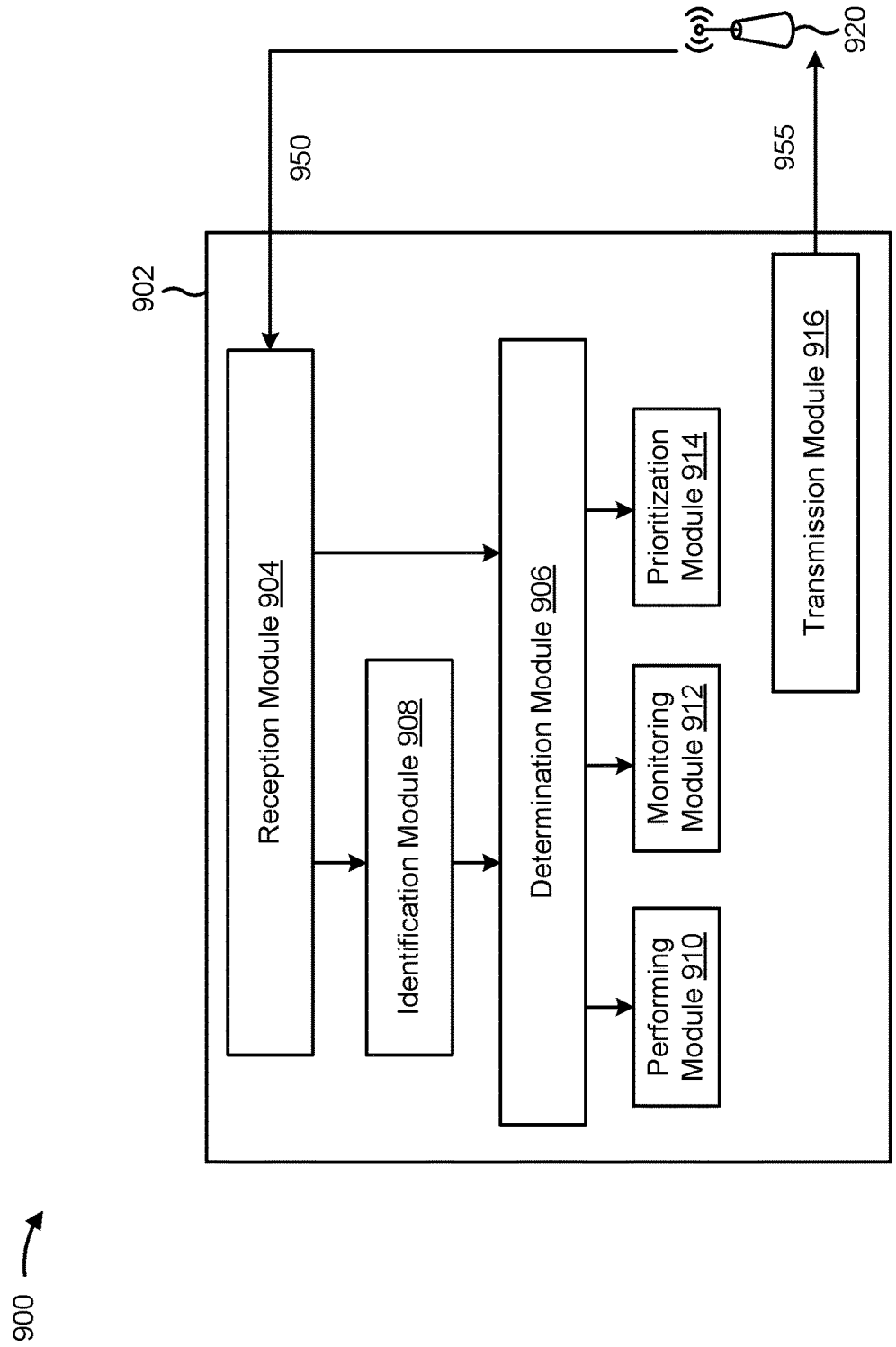
FIG. 9 is a conceptual data flow diagram illustrating examples of data flow between different modules/means/components in an example apparatus.

FIG. 9 is a conceptual data flow diagram illustrating an example 900 of a data flow between different modules/means/components in an example apparatus 902. The apparatus 902 may include, for example, a UE (e.g., UE 120). In some aspects, the apparatus 902 includes a reception module 904, a determination module 906, an identification module 908, a performing module 910, a monitoring module 912, a prioritization module 914, and/or a transmission module 916.

In some aspects, reception module 904 may receive data 950 (e.g., from one or more TRPs 920). For example, reception module 904 may receive (e.g., on a particular CORESET) DCI scheduling a PDSCH and/or a PUSCH, as described above in association with FIGS. 3A-3F.

In some aspects, determination module 906 may be associated with determining information associated with one or more operations as described herein. For example, determination module 906 may determine a fixed higher layer index that identifies a CORESET group with which a particular CORESET is associated, as described above in connection with FIG. 3B. As another example, determination module 906 may determine a QCL for a PDSCH based at least in part on a QCL of a particular CORESET, as described above in connection with FIG. 3C. As another example, determination module 906 may determine that apparatus 902 is to monitor PDCCH candidates in overlapping PDCCH monitoring occasions in multiple CORESETs having different QCL type properties on active downlink bandwidth parts of one or more cells, as described above in connection with FIG. 3D. As another example, determination module 906 may determine a set of prioritized CORESETs, as described above in connection with FIG. 3D. As another example, determination module 906 may determine that a PDSCH overlaps with a PDCCH to be received by apparatus 902, as described above in connection with FIG. 3E. As another example, determination module 906 may determine that a first PDSCH to be received on a first cell, associated with a frequency band, overlaps with a second PDSCH to be received on a second cell associated with the frequency band, as described above in connection with FIG. 3F. As another example, determination module 906 may determine that a first CORESET and a second CORESET are in a same CORESET group, as described above in connection with FIGS. 3E and 3F.

In some aspects, identification module 908 may be associated with identifying one or more items of information as described herein. For example, identification module 908 may identify, based at least in part on receiving DCI on a CORESET and based at least in part on apparatus 902 being configured with multi-DCI based multi-TRP operation, a particular CORESET having a lowest CORESET identifier associated with a monitored search space among a set of CORESETs in a latest slot monitored by the UE, and a same higher layer index as the CORESET on which the DCI was received, as described above in connection with FIG. 3C.

In some aspects, performing module 910 may be associated with performing one or more operations as described herein. For example, performing module 910 may perform an operation, associated with receiving a PDSCH or transmitting a PUSCH, based at least in part on a fixed higher layer index identifying a CORESET group with which a particular CORESET is associated, as described above in connection with FIG. 3B.

In some aspects, monitoring module 912 may be associated with performing monitoring as described herein. For example, monitoring module 912 may monitor one or more PDCCH candidates in a determined set of prioritized CORESETs, as described above in connection with FIG. 3D.

In some aspects, prioritization module 914 may be associated with performing prioritization operations as described herein. For example, prioritization module 914 may selectively prioritize reception of a PDSCH or a PDCCH based at least in part on a priority rule and based at least in part on a first CORESET and a second CORESET, associated with the PDSCH and the PDCCH, being in a same CORESET group, as described above in connection with FIG. 3E. As another example, prioritization module 914 may prioritize reception of a first PDSCH or a second PDSCH based at least in part on a priority rule and based at least in part on determining that a first CORESET and a second CORESET, associated with the first and second PDSCHs, are included in the same CORESET group, as described above in connection with FIG. 3F.

In some aspects, transmission module 916 may be associated with transmitting data 955 to TRP 920. For example, transmission module 916 may transmit data 955, associated with one or more operations described in connection with FIGS. 3A-3GF, to one or more TRPs 920.

In some aspects, apparatus 902 may include additional modules that perform each of the blocks of the algorithm in the aforementioned flowcharts of FIGS. 4-8. Each block in the aforementioned flow charts of FIGS. 4-8 may be performed by a module, and apparatus 902 may include one or more of those modules. The modules may be one or more hardware components specifically configured to carry out the stated processes/algorithms, implemented by a processor configured to perform the stated processes/algorithms, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
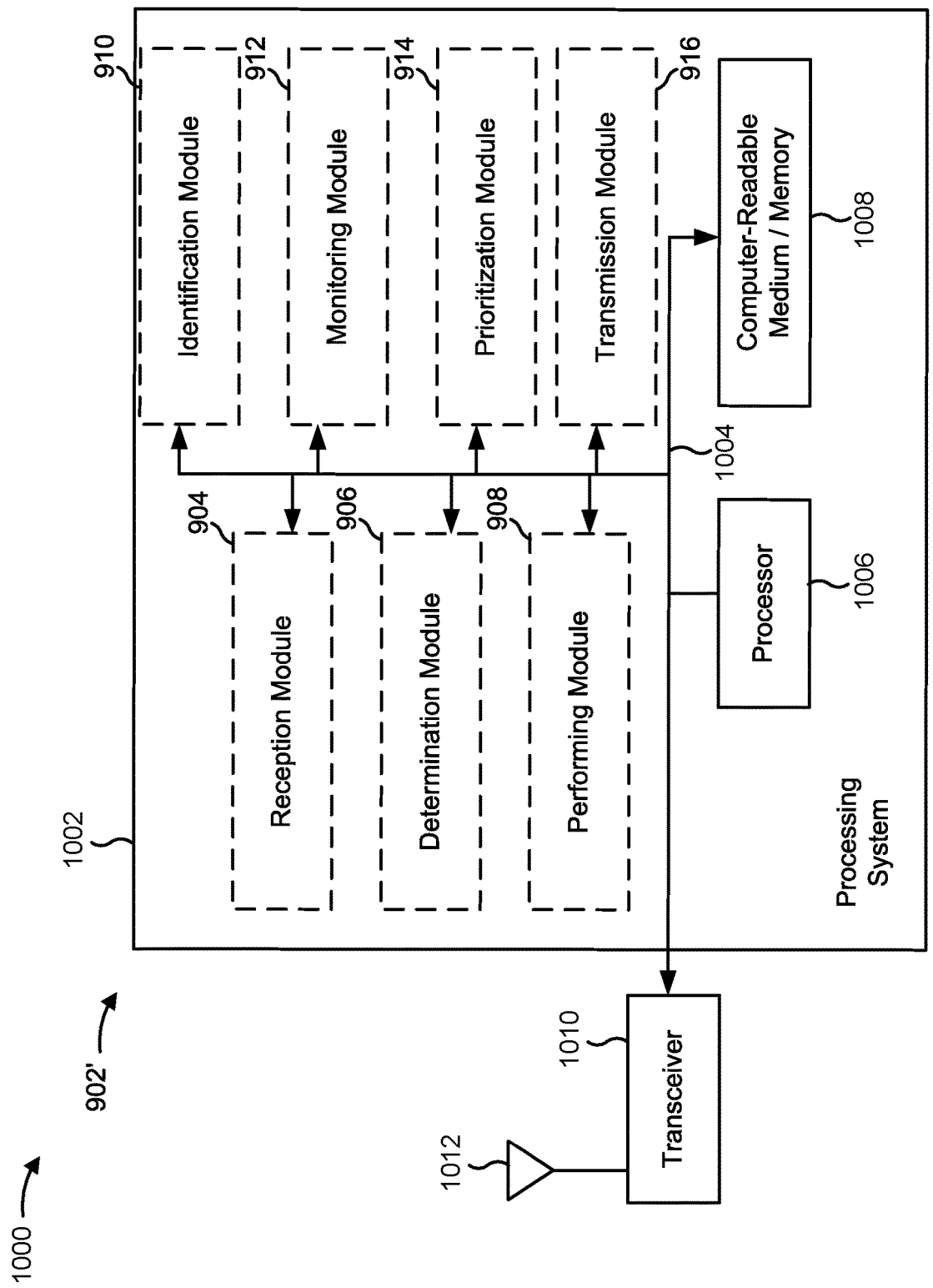
FIG. 10 is a diagram illustrating an example of a hardware implementation for an apparatus employing a processing system.

FIG. 10 is a diagram illustrating an example 1000 of a hardware implementation for an apparatus 902' (e.g., apparatus 902 described above in connection with FIG. 9) employing a processing system 1002. The apparatus 902' may include, for example, a UE (e.g., UE 120).

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, 908, 910, 912, 914, 916, and the computer-readable medium/memory 1008. The bus 1004 may also link various other circuits such as timing sources, peripherals, voltage regulators, and power management circuits, which are well known in the art, and therefore will not be described any further.

The processing system 1002 may be coupled to a transceiver 1010. The transceiver 1010 is coupled to one or more antennas 1012. The transceiver 1010 provides a means for communicating with various other apparatuses over a transmission medium. The transceiver 1010 receives a signal from the one or more antennas 1012, extracts information from the received signal, and provides the extracted information to the processing system 1002. In addition, the transceiver 1010 receives information from the processing system 1002 and, based at least in part on the received information, generates a signal to be applied to the one or more antennas 1012.

The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described above for any particular apparatus. The computer-readable medium/memory 1008 may also be used for storing data that is manipulated by the processor 1006 when executing software. The processing system further includes at least one of the modules 904, 906, 908, 910, 912, 914, 916. The modules may be software modules running in the processor 1006, resident/stored in the computer readable medium/memory 1008, one or more hardware modules coupled to the processor 1006, or some combination thereof.

In some aspects, the apparatus 902' for wireless communication includes means for receiving, on a particular CORESET, DCI scheduling a PDSCH or a PUSCH, wherein the apparatus 902' is configured with multi-DCI based multi-TRP operation; means for determining, based at least in part on the UE being configured with multi-DCI based multi-TRP operation, a fixed higher layer index that identifies a CORESET group with which the particular CORESET is associated; and means for performing an operation, associated with receiving the PDSCH or transmitting the PUSCH, based at least in part on the fixed higher layer index identifying the CORESET group with which the particular CORESET is associated.

In some aspects, the apparatus 902' for wireless communication includes means for receiving DCI on a CORESET, the DCI scheduling a PDSCH, wherein the apparatus 902' is configured with multi-DCI based multi-TRP operation; means for identifying, based at least in part on receiving the DCI on the CORESET and based at least in part on the apparatus 902' being configured with multi-DCI based multi-TRP operation, a particular CORESET having: a lowest CORESET identifier associated with a monitored search space among a set of CORESETs in a latest slot monitored by the apparatus 902', and a same higher layer index as the CORESET on which the DCI was received; and means for determining a QCL for the PDSCH based at least in part on a QCL of the particular CORESET.

In some aspects, the apparatus 902' for wireless communication includes means for determining that the UE is to monitor PDCCH candidates in overlapping PDCCH monitoring occasions in multiple CORESETs having different QCL type properties on active downlink bandwidth parts of one or more cells, wherein the apparatus 902' is configured with multi-DCI based multi-TRP operation; means for determining a set of prioritized CORESETs, each of the set of prioritized CORESETs being included in a respective CORESET group of a set of CORESET groups, wherein, for each CORESET group, a respective prioritized CORESET is determined based at least in part on a priority rule, and wherein the set of CORESET groups include the multiple CORESETs; and means for monitoring one or more PDCCH candidates in the determined set of prioritized CORESETs.

In some aspects, the apparatus 902' for wireless communication includes means for receiving DCI including an indication to receive a PDSCH, wherein the DCI is received on a first CORESET, and wherein the apparatus 902' is configured with multi-DCI based multi-TRP operation; means for determining that the PDSCH overlaps with a PDCCH to be received by the UE on a second CORESET; means for determining that the first CORESET and the second CORESET are in a same CORESET group; and means for selectively prioritizing reception of the PDSCH or the PDCCH based at least in part on a priority rule and based at least in part on the first CORESET and the second CORESET being in the same CORESET group.

In some aspects, the apparatus 902' for wireless communication includes means for determining that a first PDSCH to be received on a first cell, associated with a frequency band, overlaps with a second PDSCH to be received on a second cell associated with the frequency band, wherein the first PDSCH is associated with first DCI received on a first CORESET and the second PDSCH is associated with second DCI received on a second CORESET, and wherein the apparatus 902' is configured with multi-DCI based multi-TRP operation; means for determining that the first CORESET and the second CORESET are included in a same CORESET group; and means for prioritizing reception of the first PDSCH or the second PDSCH based at least in part on a priority rule and based at least in part on determining that the first CORESET and the second CORESET are included in the same CORESET group.

The aforementioned means may be one or more of the aforementioned modules of the apparatus 902' and/or the processing system 1002 of the apparatus 902' configured to perform the functions recited by the aforementioned means.

As indicated above, FIG. 10 is provided as an example. Other examples may differ from what is described with regard to FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
 receiving downlink control information (DCI) including an indication to receive a physical downlink shared channel (PDSCH),
  wherein the DCI is received on a first control resource set (CORESET), and
  wherein the UE is configured with multi-DCI based multi-transmission/reception point (TRP) operation;
 determining that the PDSCH overlaps with a physical downlink control channel (PDCCH) to be received by the UE on a second CORESET;
 determining that the first CORESET and the second CORESET are in a same CORESET group; and
 selectively prioritizing reception of the PDSCH or the PDCCH based at least in part on a priority rule and based at least in part on the first CORESET and the second CORESET being in the same CORESET group.

2. The method of claim 1, wherein the UE is capable of concurrently receiving at least two channels with different quasi co-location (QCL) type properties.

3. The method of claim 2, wherein the different QCL type properties are different QCL Type D properties.

4. The method of claim 1, wherein the first CORESET is associated with a first cell in a frequency band and the second CORESET is associated with a second cell in the frequency band.

5. The method of claim 1, wherein the priority rule prioritizes reception of the PDCCH over reception of the PDSCH when a QCL of the PDSCH and a QCL of the second CORESET have different QCL type properties.

6. The method of claim 1, wherein the priority rule prioritizes reception of the PDSCH over reception of the PDCCH when a QCL of the PDSCH and a QCL of the second CORESET have different QCL type properties.

7. The method of claim 1, wherein the priority rule permits reception of both the PDSCH and the PDCCH when a QCL of the PDSCH and a QCL of the second CORESET have the same QCL type properties.

8. The method of claim 1, wherein the UE is incapable of concurrently receiving at least two channels with different QCL type properties.

9. The method of claim 8, wherein the CORESET group including the first CORESET and the second CORESET is prioritized based at least in part on the UE being incapable of concurrently receiving at least two channels with different QCL type properties.

10. The method of claim 1, wherein the CORESET group is prioritized based at least in part on the CORESET group being associated with a particular higher layer index.

11. The method of claim 1, wherein the CORESET group is prioritized based at least in part on a particular CORESET being included in the CORESET group.

12. A user equipment (UE) for wireless communication, comprising:
 one or more memories; and
 one or more processors coupled to the one or more memories, the one or more processors configured to:
  receive downlink control information (DCI) including an indication to receive a physical downlink shared channel (PDSCH),
   wherein the DCI is received on a first control resource set (CORESET), and
   wherein the UE is configured with multi-DCI based multi-transmission/reception point (TRP) operation;
  determine that the PDSCH overlaps with a physical downlink control channel (PDCCH) to be received by the UE on a second CORESET;
  determine that the first CORESET and the second CORESET are in a same CORESET group; and
  selectively prioritize reception of the PDSCH or the PDCCH based at least in part on a priority rule and based at least in part on the first CORESET and the second CORESET being in the same CORESET group.

13. The UE of claim 12, wherein the UE is capable of concurrently receiving at least two channels with different quasi co-location (QCL) type properties.

14. The UE of claim 13, wherein the different QCL type properties are different QCL Type D properties.

15. The UE of claim 12, wherein the first CORESET is associated with a first cell in a frequency band and the second CORESET is associated with a second cell in the frequency band.

16. The UE of claim 12, wherein the priority rule prioritizes reception of the PDCCH over reception of the PDSCH when a QCL of the PDSCH and a QCL of the second CORESET have different QCL type properties.

17. The UE of claim 12, wherein the priority rule prioritizes reception of the PDSCH over reception of the PDCCH when a QCL of the PDSCH and a QCL of the second CORESET have different QCL type properties.

18. The UE of claim 12, wherein the priority rule permits reception of both the PDSCH and the PDCCH when a QCL of the PDSCH and a QCL of the second CORESET have the same QCL type properties.

19. The UE of claim 12, wherein the UE is incapable of concurrently receiving at least two channels with different QCL type properties.

20. The UE of claim 19, wherein the CORESET group including the first CORESET and the second CORESET is prioritized based at least in part on the UE being incapable of concurrently receiving at least two channels with different QCL type properties.

21. The UE of claim 12, wherein the CORESET group is prioritized based at least in part on the CORESET group being associated with a particular higher layer index.

22. The UE of claim 12, wherein the CORESET group is prioritized based at least in part on a particular CORESET being included in the CORESET group.

23. An apparatus for wireless communication, comprising:
 means for receiving downlink control information (DCI) including an indication to receive a physical downlink shared channel (PDSCH), wherein the DCI is received on a first control resource set (CORESET), and wherein the apparatus is configured with multi-DCI based multi-transmission/reception point (TRP) operation;

means for determining that the PDSCH overlaps with a physical downlink control channel (PDCCH) to be received by the apparatus on a second CORESET;

means for determining that the first CORESET and the second CORESET are in a same CORESET group; and means for selectively prioritizing reception of the PDSCH or the PDCCH based at least in part on a priority rule and based at least in part on the first CORESET and the second CORESET being in the same CORESET group.

24. The apparatus of claim 23, wherein the priority rule prioritizes reception of the PDCCH over reception of the PDSCH when a QCL of the PDSCH and a QCL of the second CORESET have different QCL type properties.

25. The apparatus of claim 23, wherein the priority rule prioritizes reception of the PDSCH over reception of the PDCCH when a QCL of the PDSCH and a QCL of the second CORESET have different QCL type properties.

26. The apparatus of claim 23, wherein the priority rule permits reception of both the PDSCH and the PDCCH when a QCL of the PDSCH and a QCL of the second CORESET have the same QCL type properties.

27. A non-transitory computer-readable medium storing one or more instructions for wireless communication, the one or more instructions comprising:

one or more instructions that, when executed by one or more processors of a user equipment (UE), cause the one or more processors to:

receive downlink control information (DCI) including an indication to receive a physical downlink shared channel (PDSCH), wherein the DCI is received on a first control resource set (CORESET), and wherein the UE is configured with multi-DCI based multi-transmission/reception point (TRP) operation;

determine that the PDSCH overlaps with a physical downlink control channel (PDCCH) to be received by the UE on a second CORESET;

determine that the first CORESET and the second CORESET are in a same CORESET group; and selectively prioritize reception of the PDSCH or the PDCCH based at least in part on a priority rule and based at least in part on the first CORESET and the second CORESET being in the same CORESET group.

28. The non-transitory computer-readable medium of claim 27, wherein the priority rule prioritizes reception of the PDCCH over reception of the PDSCH when a QCL of the PDSCH and a QCL of the second CORESET have different QCL type properties.

29. The non-transitory computer-readable medium of claim 27, wherein the priority rule prioritizes reception of the PDSCH over reception of the PDCCH when a QCL of the PDSCH and a QCL of the second CORESET have different QCL type properties.

30. The non-transitory computer-readable medium of claim 27, wherein the priority rule permits reception of both the PDSCH and the PDCCH when a QCL of the PDSCH and a QCL of the second CORESET have the same QCL type properties.

* * * * *